(12) United States Patent
Goldsmith et al.

(10) Patent No.: US 8,424,549 B1
(45) Date of Patent: Apr. 23, 2013

(54) TENT POLE ANCHOR APPARATUS

(75) Inventors: Howard G. Goldsmith, South Kingstown, RI (US); Richard N. St. Jean, East Greenwich, RI (US)

(73) Assignee: Giffy Tent Barrels, Inc., Westerly, RI (US)

( * ) Notice: Subject to any disclaimer, the term of this patent is extended or adjusted under 35 U.S.C. 154(b) by 254 days.

(21) Appl. No.: 12/881,221

(22) Filed: Sep. 14, 2010

(51) Int. Cl.
*E04H 15/62* (2006.01)
*F16M 13/00* (2006.01)

(52) U.S. Cl.
USPC ........ 135/120.4; 135/116; 135/117; 135/118; 248/507; 248/519; 47/67; 47/20.1

(58) Field of Classification Search .... 135/120.1–120.4, 135/135, 87, 116–119; 248/507–508, 519, 248/910, 346.2, 156, 529; 47/20.1, 39, 65.5–65.6, 47/66.1; 40/606.01, 606.11, 607.1; 116/174; 52/162, 165
See application file for complete search history.

(56) References Cited

U.S. PATENT DOCUMENTS

| | | | | |
|---|---|---|---|---|
| 2,505,885 A | * | 5/1950 | Davis, Jr. ..................... | 248/508 |
| 3,415,475 A | * | 12/1968 | Goodman ..................... | 248/158 |
| 4,122,637 A | | 10/1978 | Runge et al. | |
| 4,759,545 A | | 7/1988 | Grable | |
| 4,837,972 A | * | 6/1989 | Reed ................. | 47/67 |
| 5,020,764 A | | 6/1991 | Yamamoto | |
| 5,158,281 A | * | 10/1992 | Williams ................. | 473/483 |
| 6,539,665 B1 | * | 4/2003 | Llona .................. | 47/65.5 |
| 6,619,610 B1 | * | 9/2003 | Genovese ................. | 248/519 |
| 6,739,095 B2 | | 5/2004 | Glynos | |
| 6,789,916 B2 | * | 9/2004 | Ruggles ...................... | 362/154 |
| 7,721,748 B2 | * | 5/2010 | Dreamwalker .............. | 135/114 |
| 7,722,000 B2 | * | 5/2010 | Sherburne .................... | 248/27.8 |
| 7,958,670 B2 | * | 6/2011 | Kamau ........................ | 47/66.6 |
| 2012/0017960 A1 | * | 1/2012 | Doell ......................... | 135/120.1 |

FOREIGN PATENT DOCUMENTS

| | | | |
|---|---|---|---|
| JP | 07293049 A | * | 11/1995 |
| JP | 2005155063 A | * | 6/2005 |
| WO | WO 2005005755 A1 | * | 1/2005 |

* cited by examiner

*Primary Examiner* — Winnie Yip
(74) *Attorney, Agent, or Firm* — Salter & Michaelson

(57) ABSTRACT

A tent pole anchor apparatus that includes a barrel member and a cover disposed on the barrel member. The barrel member and cover together form an internal chamber that is filled with water so as to provide a significant weight for anchoring the barrel member. The barrel member has at least one drain to enable liquid to be removed from the barrel member. At least one of the barrel member and cover has a passage for receiving an adjustment strap that interconnects the barrel member with the tent pole.

23 Claims, 31 Drawing Sheets

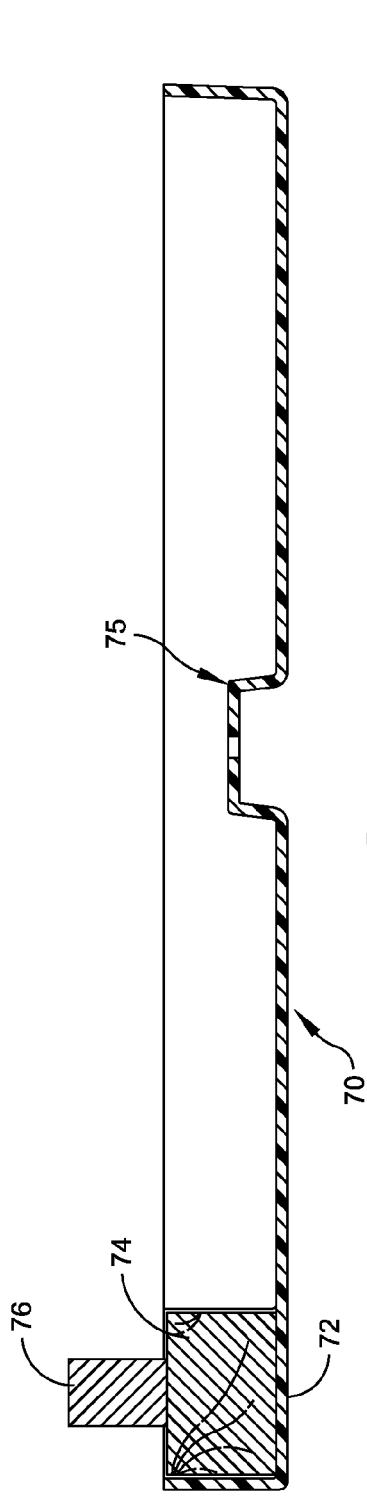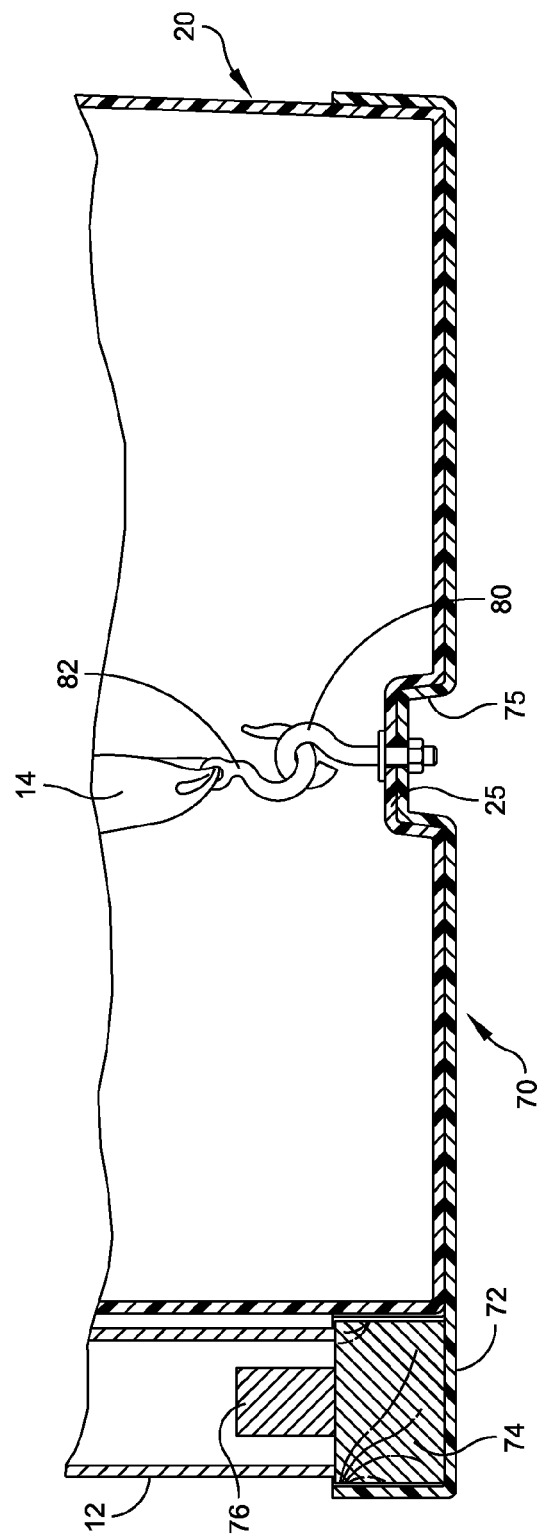
FIG. 25
FIG. 26

TENT POLE ANCHOR APPARATUS

FIELD OF THE INVENTION

The present invention relates in general to an anchor apparatus for securing a tent pole. More particularly, the present invention relates to an anchor apparatus that employs a barrel member that is preferably filled with a liquid such as water in order to provide a relatively heavy weight for anchoring a tent pole.

BACKGROUND OF THE INVENTION

Relatively large tents typically use metal stakes to hold ropes or straps that secure corners of the tent. These ropes or stakes enable tent poles to be held in an upright position. Large tents of various size are now extensively used for special events such as for weddings, anniversaries or other parties. Property owners find it undesirable to use stakes driven into the lawn. Also, including the rental industry, there are certain circumstances where it is desired to set up the tent on a parking lot or other asphalt surface. In particular, on an asphalt surface it is not desired to have steel stakes driven into the asphalt surface. At the present time, plastic storage barrels are used for securing a tent pole. It is typical to have the barrel filled with water and have the rope strap attached to the barrel with the rope typically attached to the top side of the barrel. One problem with this arrangement is that the barrels can easily tip over which certainly can cause a major problem if the water therein leaks from the barrel. Also, typically these barrels are filled from the top and emptied from the top which requires that the barrel be tipped over to remove the water from the barrel.

Most devices, presently used, are totally enclosed containers which hold water for ballast and are strapped to the poles of the tent at the top. A ratcheting tether is used to keep the barrel tort to the pole. These devices offer poor support, and are completely independent of the pole. The tether is attached to the barrel at the very top of the barrel thus forming a mechanical disadvantage to tipping the barrel over when the wind blows. Also, an alternative to the water barrel are stakes which are driven into the ground with a tether attached to the stake, and the top of the tether is attached to the pole. Because there are different ground textures (sandy versus firm), these stakes tend to loosen with a gust of wind. The same holds true for staking banners and signs. In using the above-mentioned means to hold the tent poles in place, the following disadvantages are prevalent: in the case of the barrel, the barrel tends to tip (like a bowling pin), and turn to either side and may roll, in the case of the stakes, surfaces are sometimes tar, cement or tile and stakes cannot be used or a permanent hole would have to be made which is not always agreeable with the consumer. In all cases, in the erection and dismantling of tents, quickly and easily, an important asset is to use the barrel because it does not deface any surface permanently.

Typical tent anchors are shown by way of example in U.S. Pat. No. 5,020,764 to Yamamoto and U.S. Pat. No. 6,739,095 to Glynos. The Yamamoto '764 patent describes a ballasting device 1. However, this is attached directly at the end of a pole. The Glynos '095 patent employs a tank anchor on either side of a tent; meant to hold the sidewalls down.

Accordingly, it is an object of the present invention to provide an improved anchor apparatus that is in particular usable for securing a tent pole.

Another object of the present invention is to provide a tent pole anchor apparatus that comprises a barrel member and in which a plurality of barrel members are stackable.

Another object of the present invention is to provide an improved tent pole anchor apparatus that enables the barrel member to be readily filled with water and also readily emptied.

Still another object of the present invention is to provide an improved tent pole anchor apparatus in which the tent pole rope or strap is preferably secured at a lower position of the barrel member so as to avoid tipping of the barrel member.

A further object of the present invention is to provide an improved tent pole anchor apparatus that is relatively simple in construction, that can be fabricated quickly and that is readily adapted to be set up in use in a relatively easy manner.

SUMMARY OF THE INVENTION

In accordance with the present invention there is provided an anchor apparatus for securing a tent pole. This anchor apparatus is usually used in a set of more than one for securing a tent in place. The apparatus is meant for use in replacing the usual tent stake where it is not convenient to use a tent stake. The anchor apparatus of the present invention includes a barrel member; and a cover disposed on the barrel member. The barrel member and cover together form an internal chamber that is to be filled with a liquid, preferably water, so as to provide a significant weight for anchoring the barrel member. The barrel member has at least one drain to enable the liquid to be removed from the barrel member. At least one of the barrel member and cover has a passage for receiving an adjustment strap that inter-connects the barrel member with the tent pole.

In accordance with other aspects of the present invention the barrel member has an elongated groove extending substantially vertically along a sidewall thereof and constructed and arranged to accommodate the tent pole at least partially therein; the cover has a hole adjacent a side thereof through which the tent pole can extend and in alignment with the elongated groove; the elongated groove is defined in a flat side of the barrel member; the drain includes at least one drain plug at a lower end of the barrel member; the passage for receiving the strap is defined by a diametrically disposed slot in the cover with the strap extending through the diametrically disposed slot and attached at a bottom of the barrel member; the cover has a hole separate from the diametrically disposed slot and arranged adjacent an edge of the cover and in line with the diametrically disposed slot; the passage for receiving the strap is defined by a channel in a bottom surface of the barrel member, said channel extending across a width of the bottom surface; the channel extends diametrically across the bottom surface; including an adaptor plate at the bottom surface of the barrel member extending transverse to said channel and including opposite ends thereof wherein one end of the adaptor plate sits within said channel and the other end of the adaptor plate has a support post for receiving the tent pole; including a fastener at the bottom surface of the barrel member for engaging the strap; wherein the barrel member is substantially cylindrical in shape and includes a stepped side wall; including a plurality of barrel members each having a slanted sidewall that allows the plurality of barrel members to be stackable; wherein the passage for receiving the strap is defined by at least one handle on a sidewall of the barrel member; including a pair of oppositely disposed handles on the barrel member; wherein the barrel member has a substantially square shape; further including a base ring upon which the barrel member rests; wherein the base ring has a support post for receiving the tent pole and wherein the base ring includes a channel member that engages with a like channel member in a bottom of the barrel member.

BRIEF DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which:

FIG. 25 is a cross-sectional view taken along line 25-25 of FIG. 24;

FIG. 26 is a further cross-sectional view similar to that shown in FIG. 25 but also incorporating the means for securing the bottom of the anchor strap;

DETAILED DESCRIPTION

Figure 1:
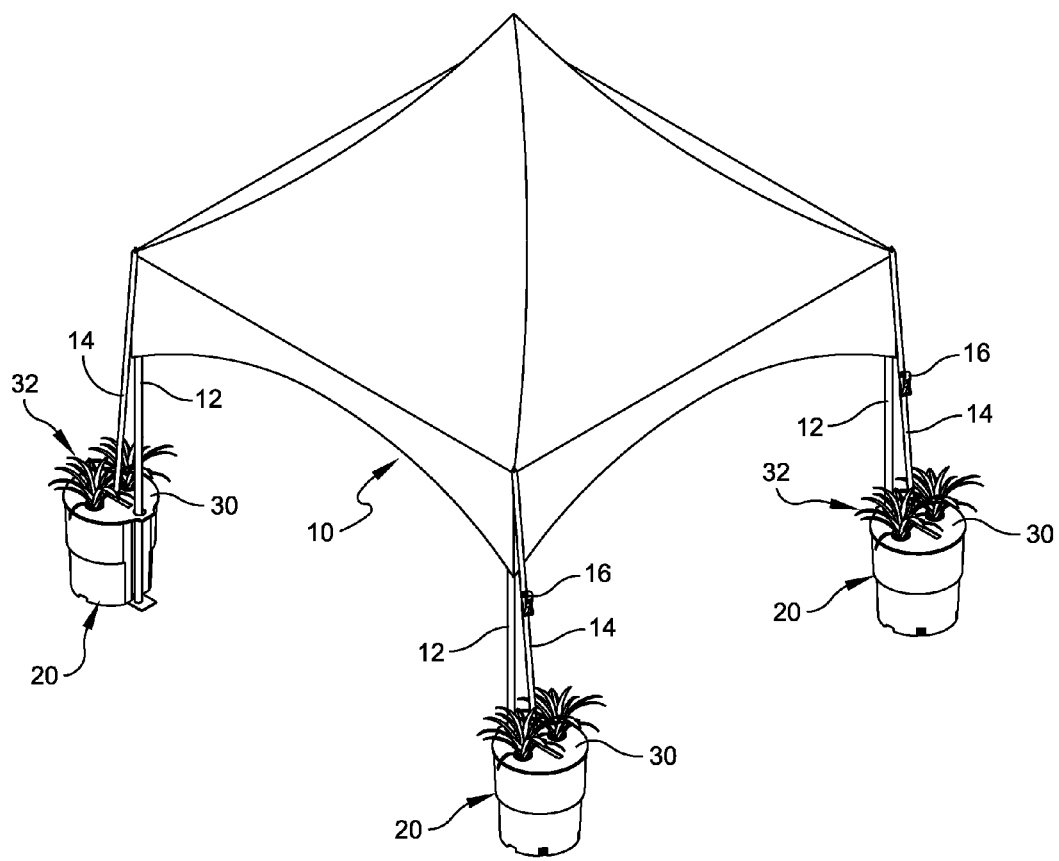
FIG. 1 is a perspective view illustrating the use of the barrel member of the present invention with a tent.

The tent pole anchor apparatus of the present invention is used for securing a tent pole by means of a strap, rope or the like that attaches at a top end of the tent pole and is secured at the opposite end to a lower position of a barrel member of the tent pole anchor apparatus. There are usually provided a plurality of barrel members each for securing a respective tent pole. The apparatus of the present invention is particularly adapted for replacing the usual tent stake. In the drawings that are illustrated herein, there are a number of different embodiments that are disclosed, and in each of these embodiments there is provided a barrel member and a cover that is disposed on the barrel member. The barrel member and cover together form an internal chamber that is to be filled with a liquid such as readily available water. This provides a significant weight for anchoring the barrel member and thus also anchoring the end of the securing strap or rope. The barrel member preferably has at least one drain to enable the liquid to be removed from the barrel member. This drain is preferably at the bottom of the barrel member.

As indicated previously, one of the important features of the present invention is that the strap or rope is secured at a bottom end of the barrel member. Another important feature is the particular construction of the barrel member that is used in accordance with the present invention. This is constructed with a draft along at least a portion thereof so that the barrel members can be nested one to the next. This allows the barrels to be transported more economically. Moreover, it is preferred that the barrel cover be provided with recesses or the like so that, for example, potted plants may be inserted into the top of the apparatus so as to provide an aesthetically attractive anchor apparatus.

The barrel is designed in such a manner that there is a V-groove running up its side which enables the tent pole to be captured on the sides and the face of the barrel. The bottom of the barrel has a channel that runs along the bottom molded into it which is perpendicular to the pole. A metal plate which is bent to fit into the channel of the barrel is bolted to the bottom of the barrel. The front of the plate extends beyond the front of the barrel, and under the tent pole. A stud is attached to the front of the plate which the tent pole fits over. The stud is meant to engage with the tent pole and can engage in any one of a number of different manners to essentially retain the tent pole in a fixed position at its bottom end thereof relative to the plate member. The inside center bottom of the barrel has an eyelid attached to the same bolt that holds the bottom plate. A tether is attached to the eyelid and to the top of the tent pole.

By doing this, we form a rigid triangle with the hypotenuse being the tether, the bottom of the barrel and the plate being the base of the triangle, and tent pole being the upright of the triangle. It is also important to note that when the wind blows on the tent, a downward force of great extreme is transferred to the bottom plate with the stud. This eliminates any chance for the barrel to move or slide. Having all of the weight being pulled on from the bottom of the barrel increases the stability of the tent pole substantially, and the fact that the pole is pinned and secured stops any lifting action.

Presently, barrels which are being used are a total entity or a one piece barrel (top and bottom). Shipping these barrels to the jobsite is a problem. A pick-up truck can carry no more than 15 barrels. The unique feature of this new barrel is that it is stackable and 50 barrels can fit into a pick-up truck. The barrels presently being used can only be evacuated by tipping them upside down. The new barrel has two large evacuation caps so the barrel can be evacuated in a standing position. The cover of the barrel is removable and has two recesses for floral pots to be put in for decoration. The new barrel is far more stable. It is preferably 30" tall and 29" outside diameter.

Figure 2:
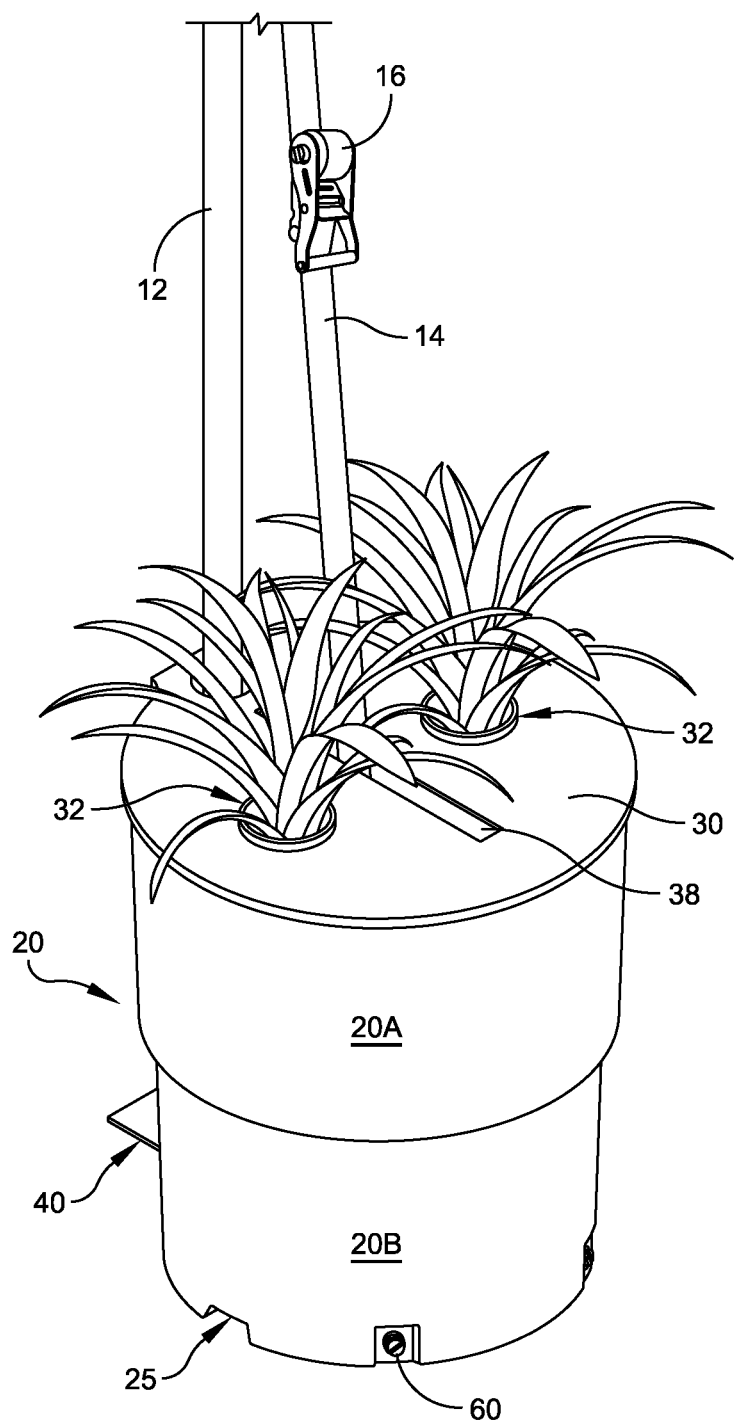
FIG. 2 is an enlarged perspective view of one of the barrel members.
Figure 3:
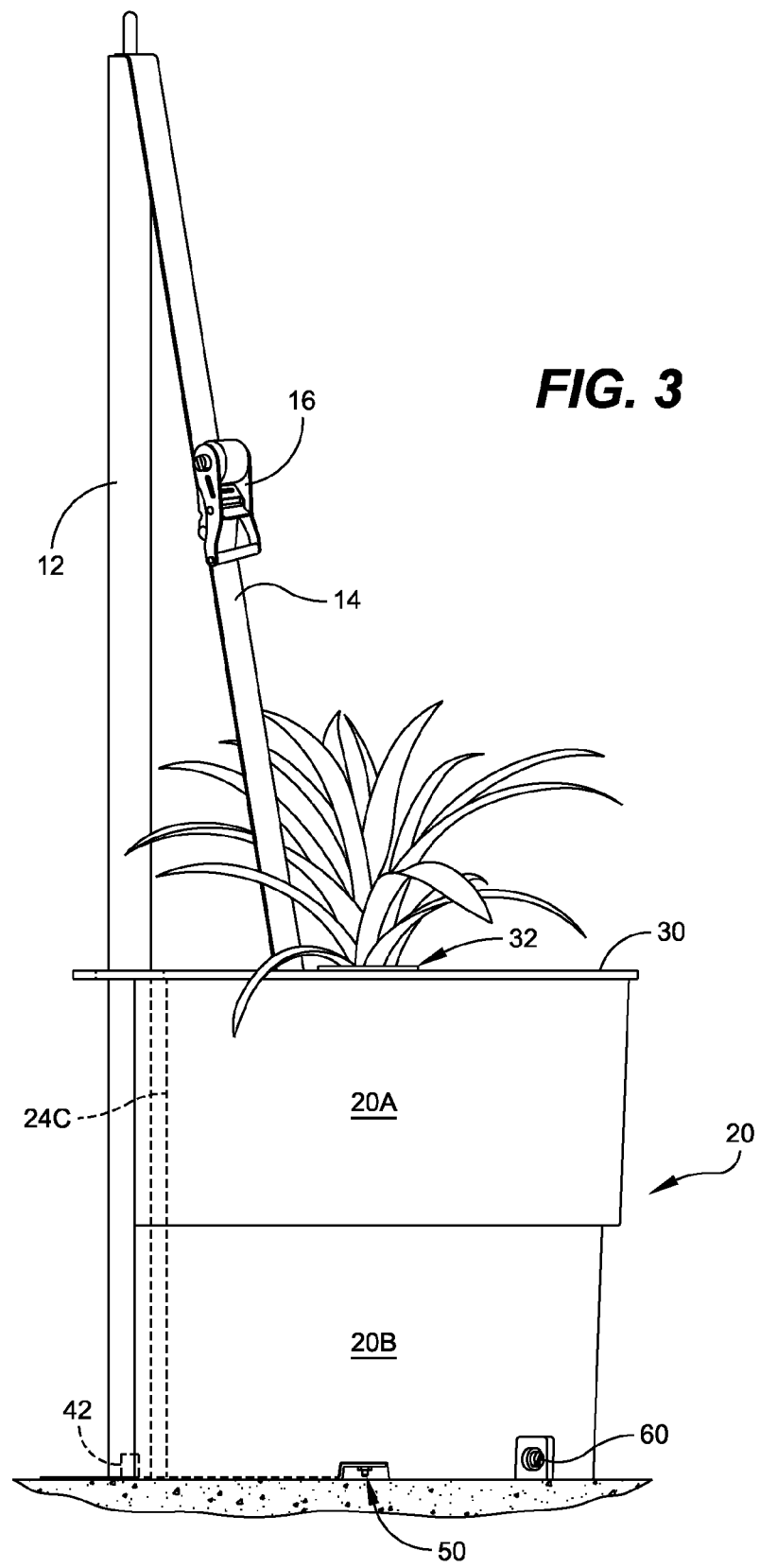
FIG. 3 is a side elevation view of one of the barrel members.
Figure 4:
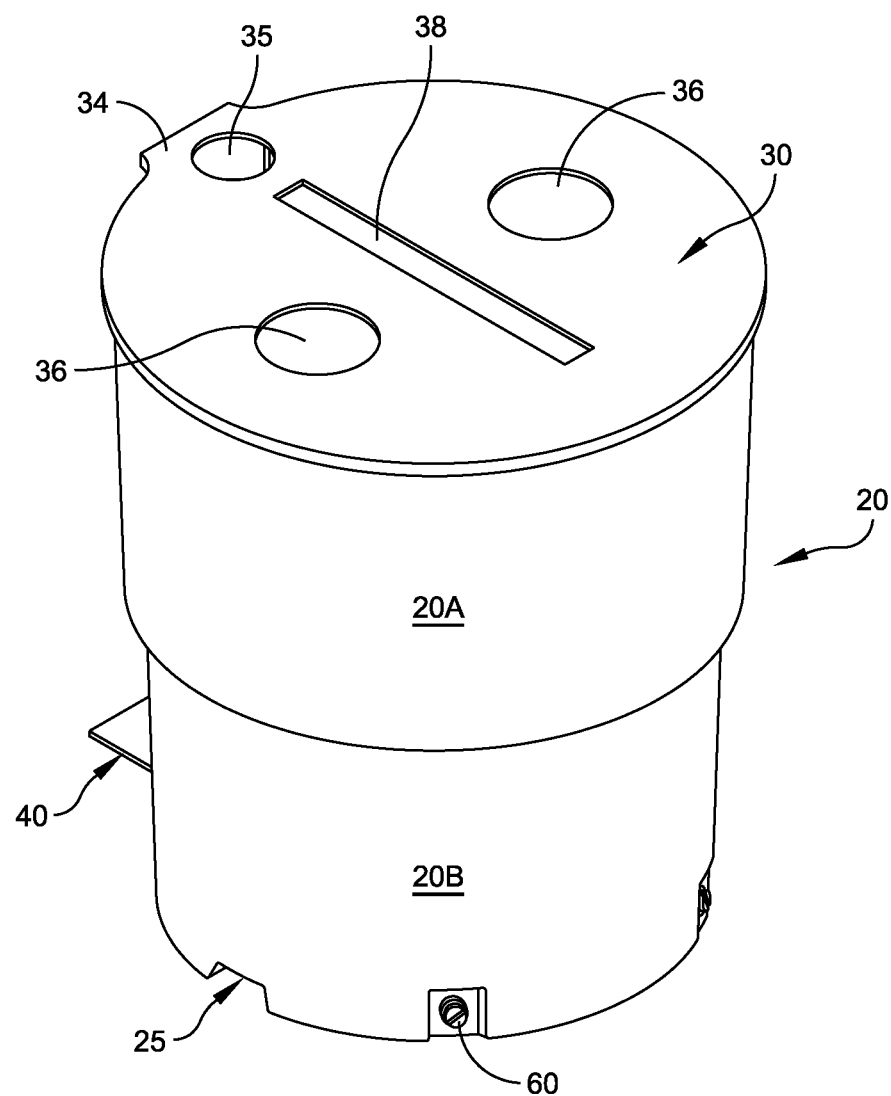
FIG. 4 is a perspective view of one of the barrel members.
Figure 5:
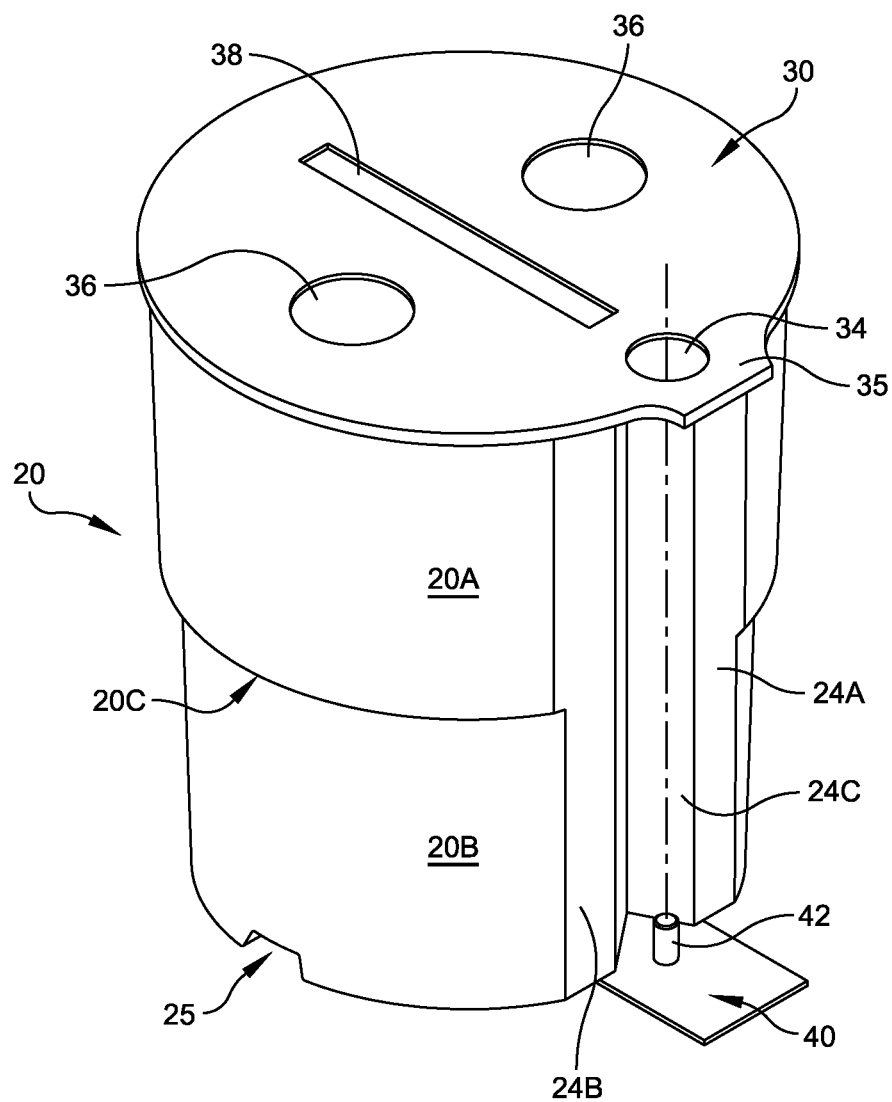
FIG. 5 is an opposite side perspective view of the barrel member of FIG. 4.
Figure 6:
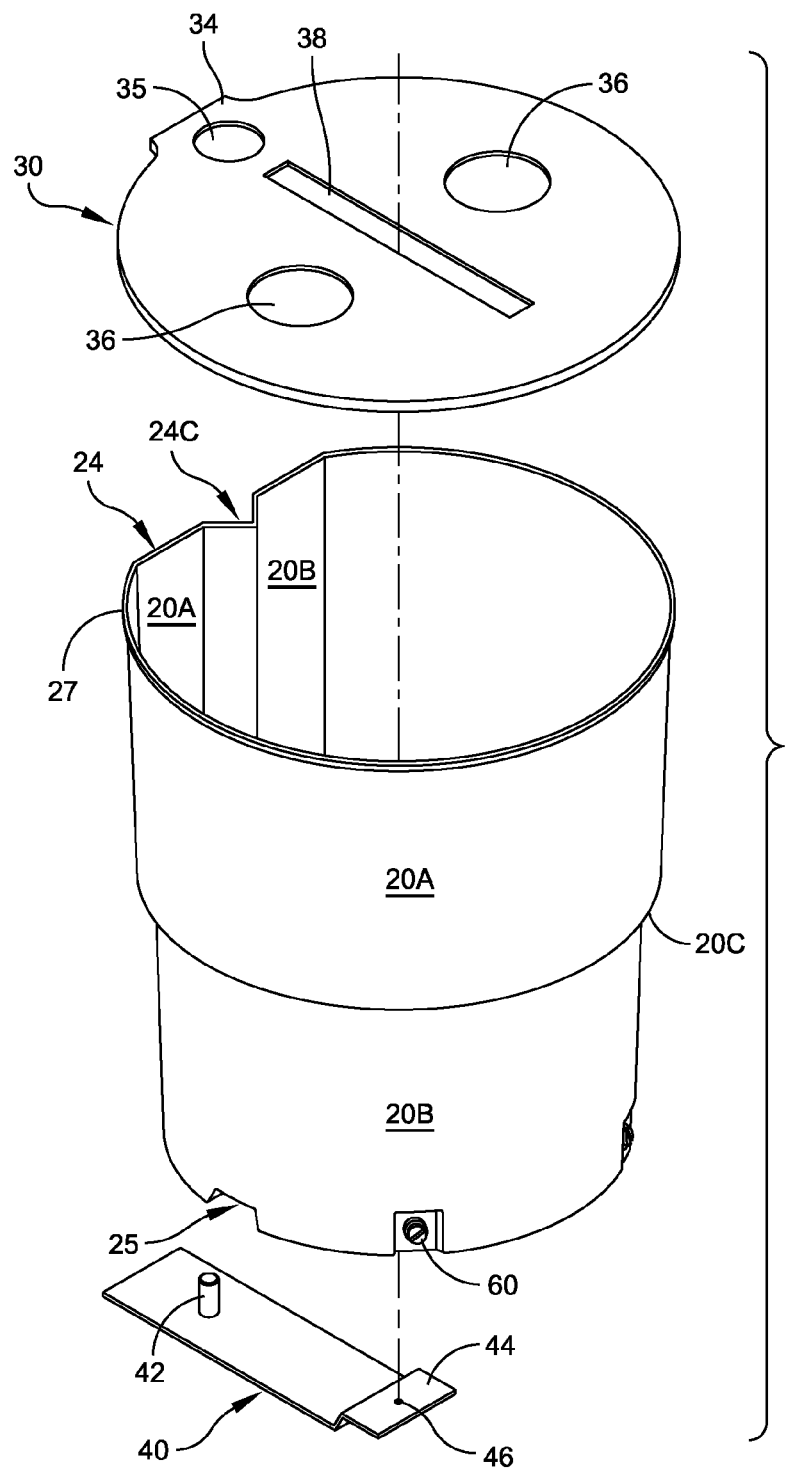
FIG. 6 is an exploded perspective view of the barrel member and cover.
Figure 7:
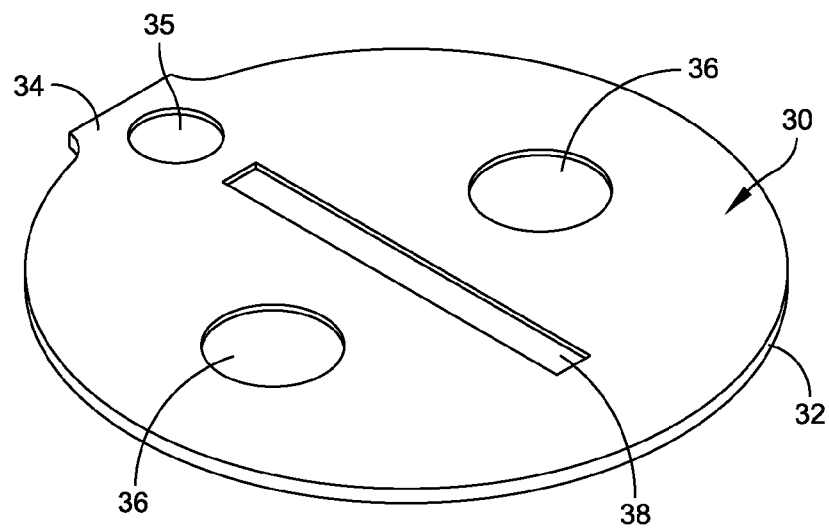
FIG. 7 is a perspective view of the cover alone.
Figure 8:
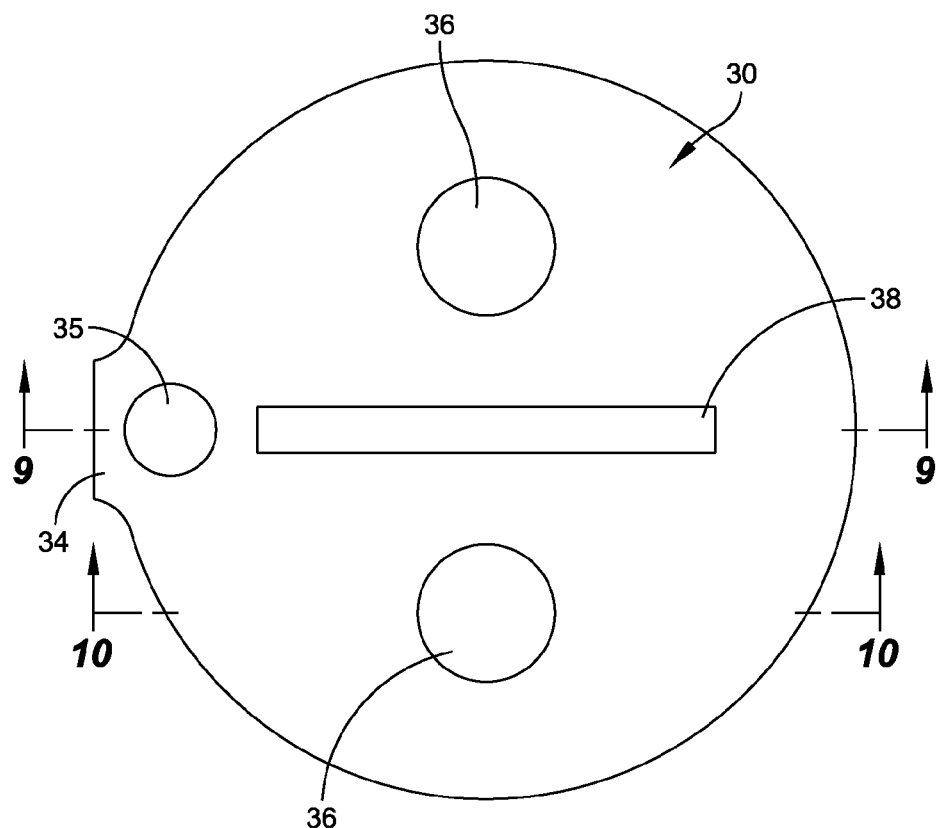
FIG. 8 is a plan view of the cover.
Figure 9:
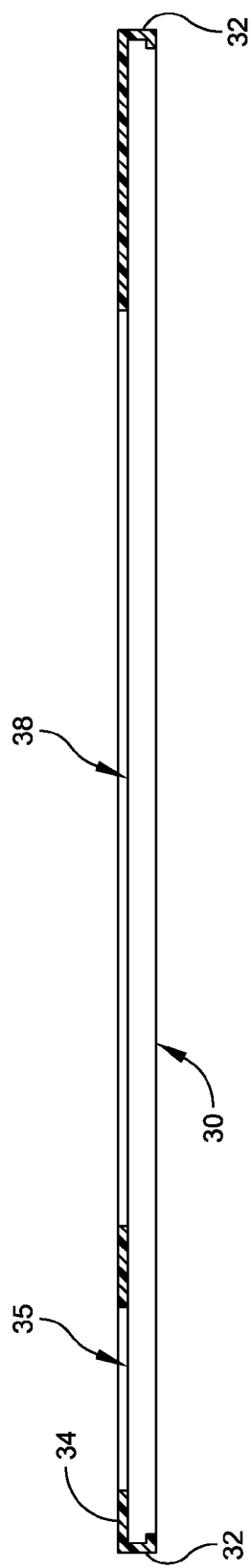
FIG. 9 is a cross-sectional view taken along line 9-9 of FIG. 8.
Figure 10:
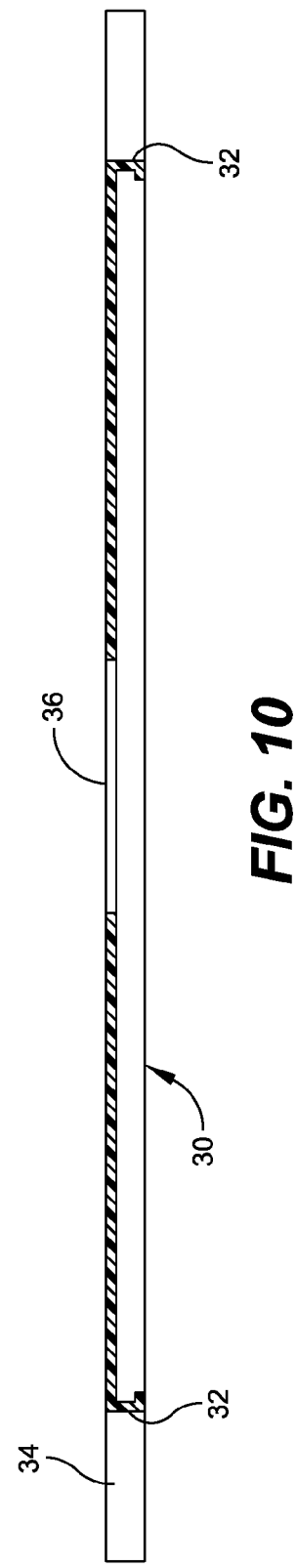
FIG. 10 is a cross-sectional view taken along line 10-10 of FIG. 8.

Reference is now made to FIG. 1 for an illustration of a tent 10 that is supported by four tent poles 12 only three of which are actually illustrated in FIG. 1. A strap 14 is also illustrated in FIG. 1 extending from a top end of the tent pole 12 to the barrel member 20. Each of these straps 14 may be of conventional design and typically is provided with a ratchet mechanism 16. FIGS. 2 and 3 show further details of the ratchet mechanism 16. Also, in place of the strap 14, a rope or the like may also be employed for connecting the top of the tent pole with the barrel member 20. FIG. 1 also shows, on the barrel member 20, a cover 30. The cover 30 may be provided with one or more holes or depressions for receiving, for example, flower pots as illustrated at 32 in FIGS. 1-3.

Figure 11:
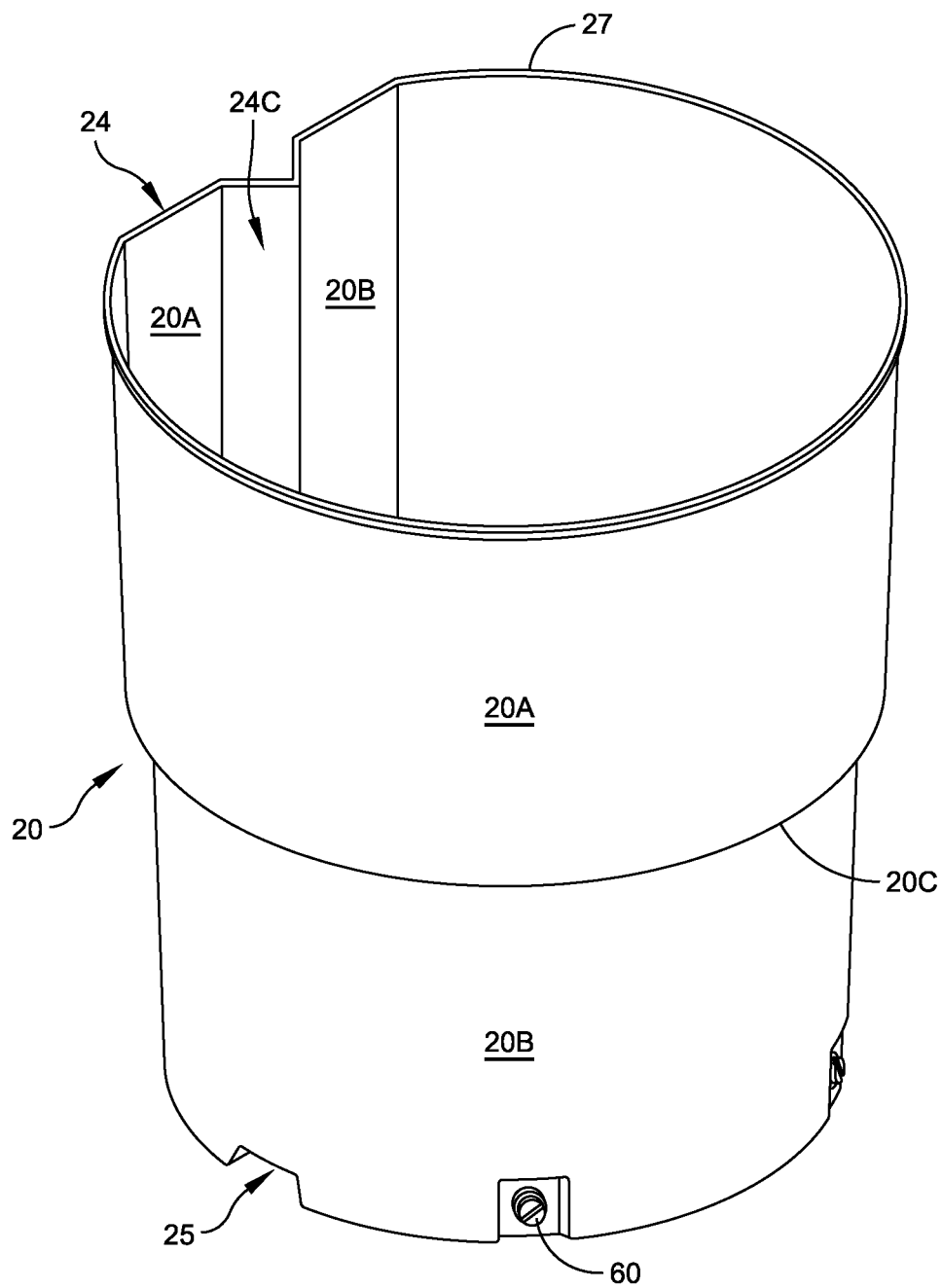
FIG. 11 is a perspective view of the barrel member alone.
Figure 12:
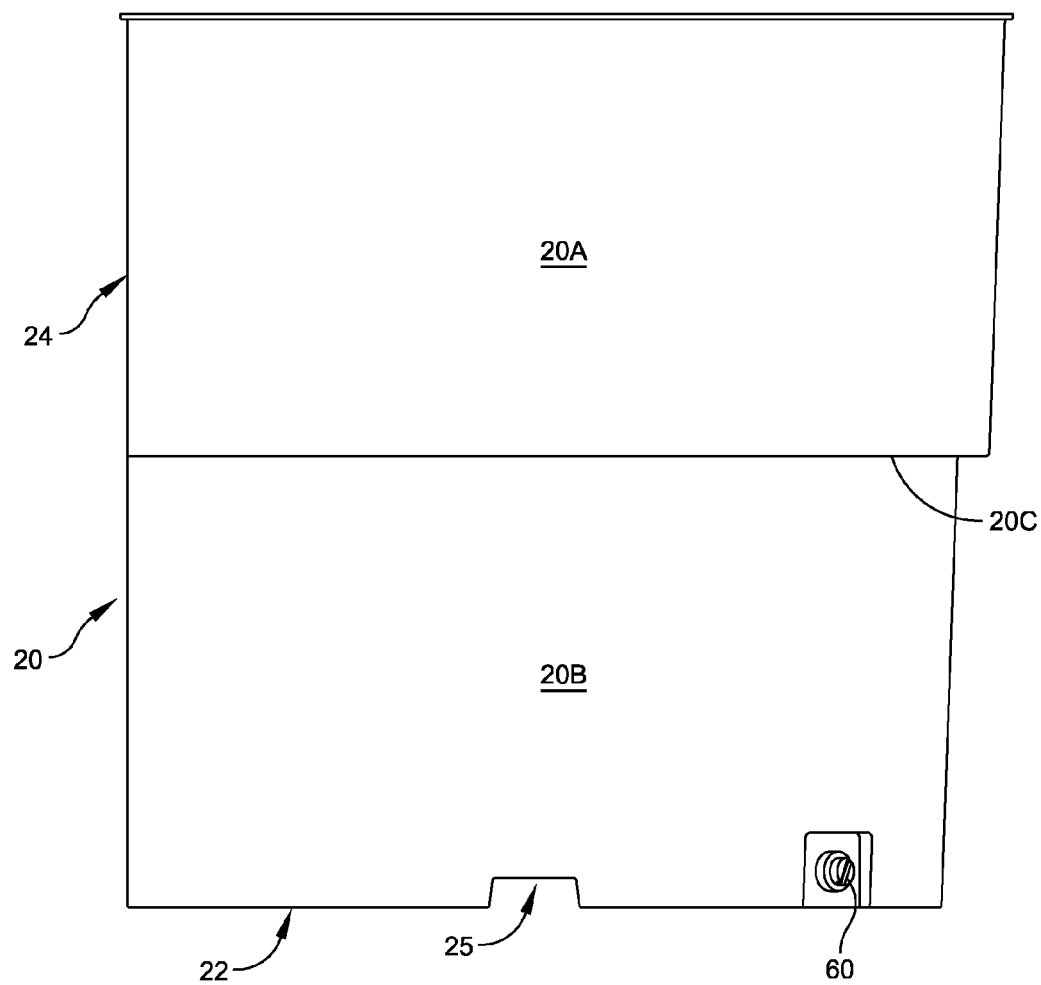
FIG. 12 is a side elevation view of the barrel member.

For further details of the barrel member 20, refer to FIGS. 1-6 and 11-21. FIG. 11, in particular, shows the barrel member 20 standing alone. In this particular embodiment, the barrel member is of substantially cylindrical shape at least about its front and sides. The barrel member includes an upper partially cylindrical section 20A and a lower partially cylindrical section 20B. These cylindrical sections 20A and 20B are interconnected by a step 20C. The barrel member 20 also includes a bottom 22 that is integral with the lower partially cylindrical section 20B. In this regard, refer to FIG. 15 which shows a plan view as viewed inside the barrel from the top of the bottom 22. Also refer to the cross-sectional views of FIGS. 16 and 17 for an illustration of the bottom 22.

At what may be considered the rear of the barrel member 20, rather than a cylindrical surface, there is a flat surface 24 separated into respective flat surface sections 24A and 24B. This flat surface 24 extends from the top edge 25 of the barrel member to the bottom 22. The flat surfaces 24A and 24B are separated by a V-shaped groove 24C. In this regard refer, for example, to the perspective view of FIG. 5, as well as the rear view of FIG. 14.

As noted in the drawings, the V-groove 24C is integral with the side flat surfaces 24A and 24B. The groove 24C is shown as V-shaped. However, the groove could also have other cross-sectional configurations including a concave shape. One purpose of the groove 24C is to accommodate the tent pole 14 which may extend therethrough as shown in FIG. 1. Refer also to the cross-sectional view of FIG. 17 that shows the tent pole 12 disposed within the V-shaped groove and held in place at the bottom by means of support plate 40. In this regard refer to the cross-sectional view of FIG. 17 that shows the support plate 40 disposed at the bottom of the barrel member with the tent pole 12 aligned with a pin 42 of the support plate 40. As noted in FIG. 17, the tent pole 12 also extends through a hole in the cover 30 as will be described in further detail hereinafter.

Figure 15:
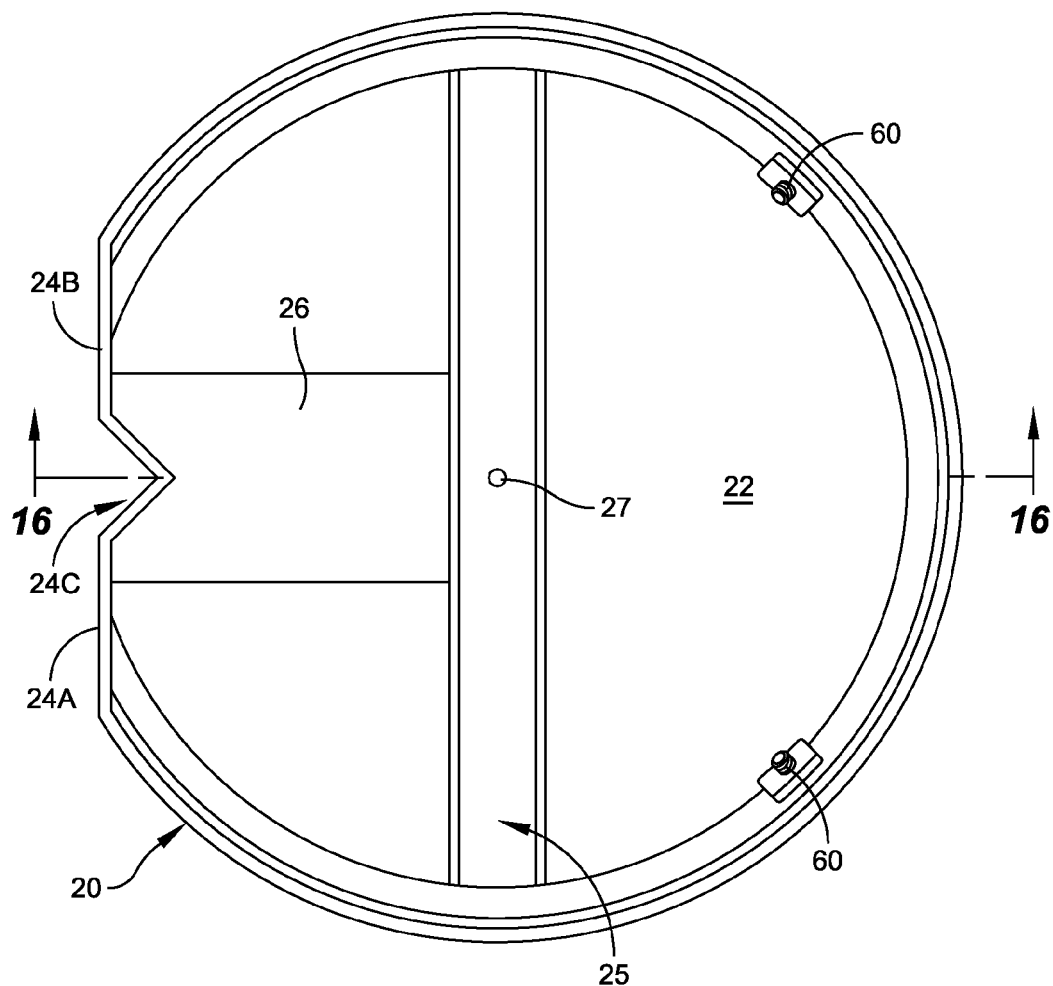
FIG. 15 is a top plan view of the barrel member with the cover removed.
Figure 16:
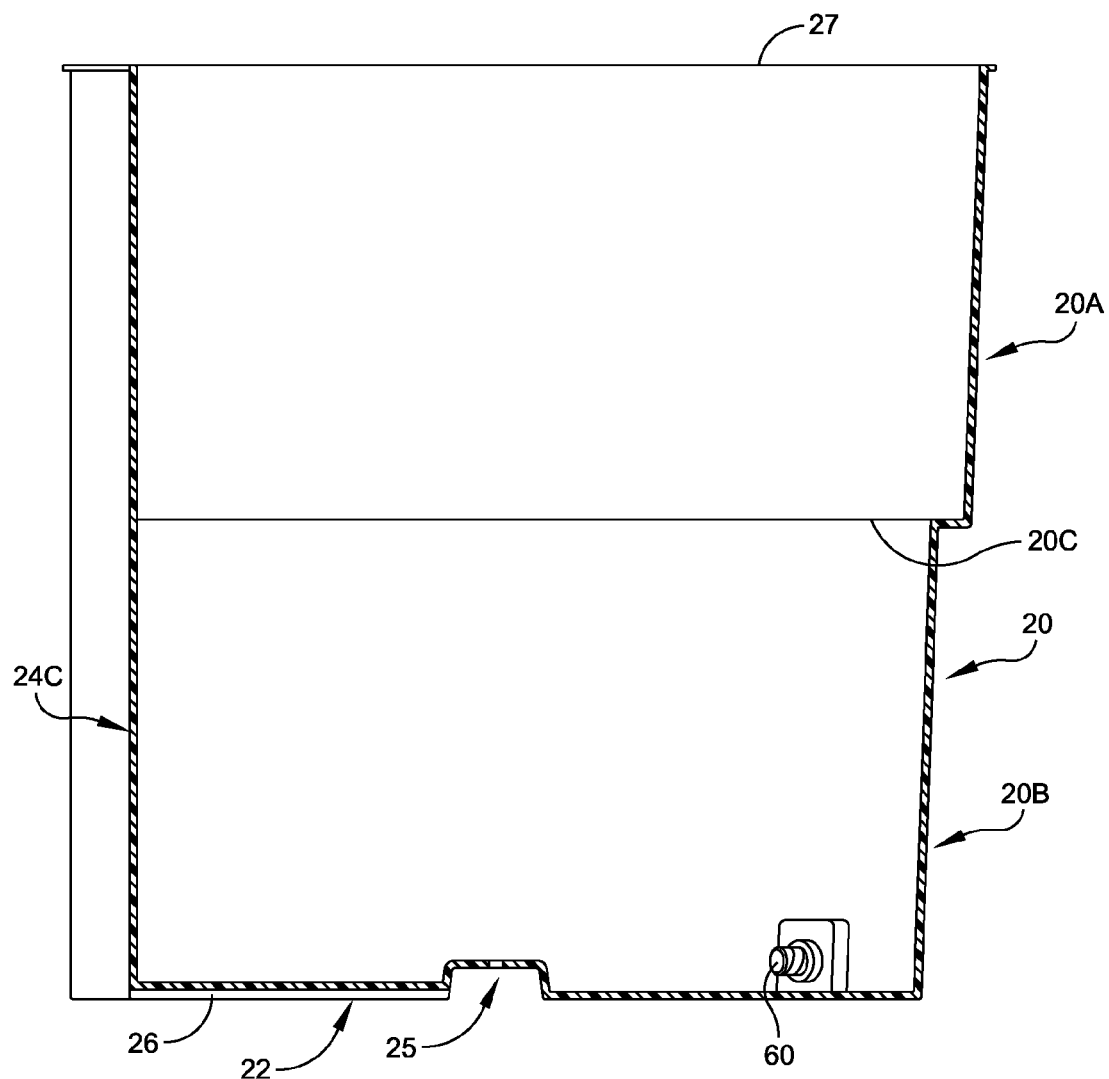
FIG. 16 is a cross-sectional view taken along line 16-16 of FIG. 15.
Figure 17:
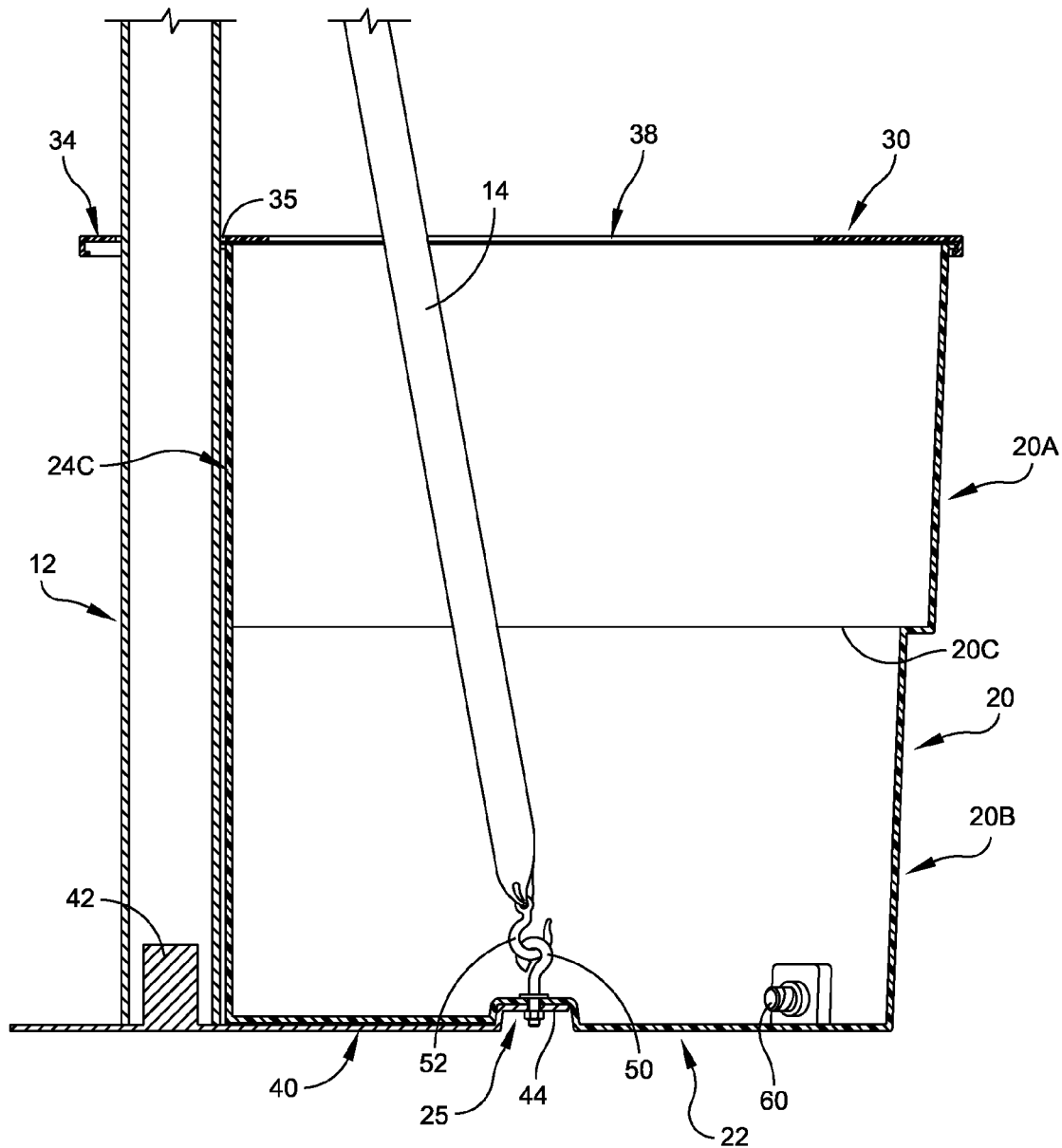
FIG. 17 is a cross-sectional view similar to that shown in FIG. 16 but also illustrating the connection of the strap at the base of the barrel member.

In accordance with the present invention and to provide a proper stability for the barrel member, it is preferred that the barrel member have a flat side such as shown at 24A and 24B in FIG. 15. Moreover, it is preferred that this flat side extend in a direction that is substantially orthogonal to the bottom wall 22. The bottom 22 of the barrel member is also preferably provided with a cross-channel. A cross-sectional view of the cross-channel 25 is shown in FIGS. 16 and 17. Refer also to the view at the bottom of the barrel member shown in the upper side of the channel 25. A further channel 26 is also provided that extends substantially orthogonal to the channel 25 and extends between the flat wall 24A, 24B and the channel 25. Refer also to the cross-sectional view of FIG. 16 that shows the channel 26. As depicted in FIG. 15, the channel 26 is preferably wider than the channel 25.

Figure 13:
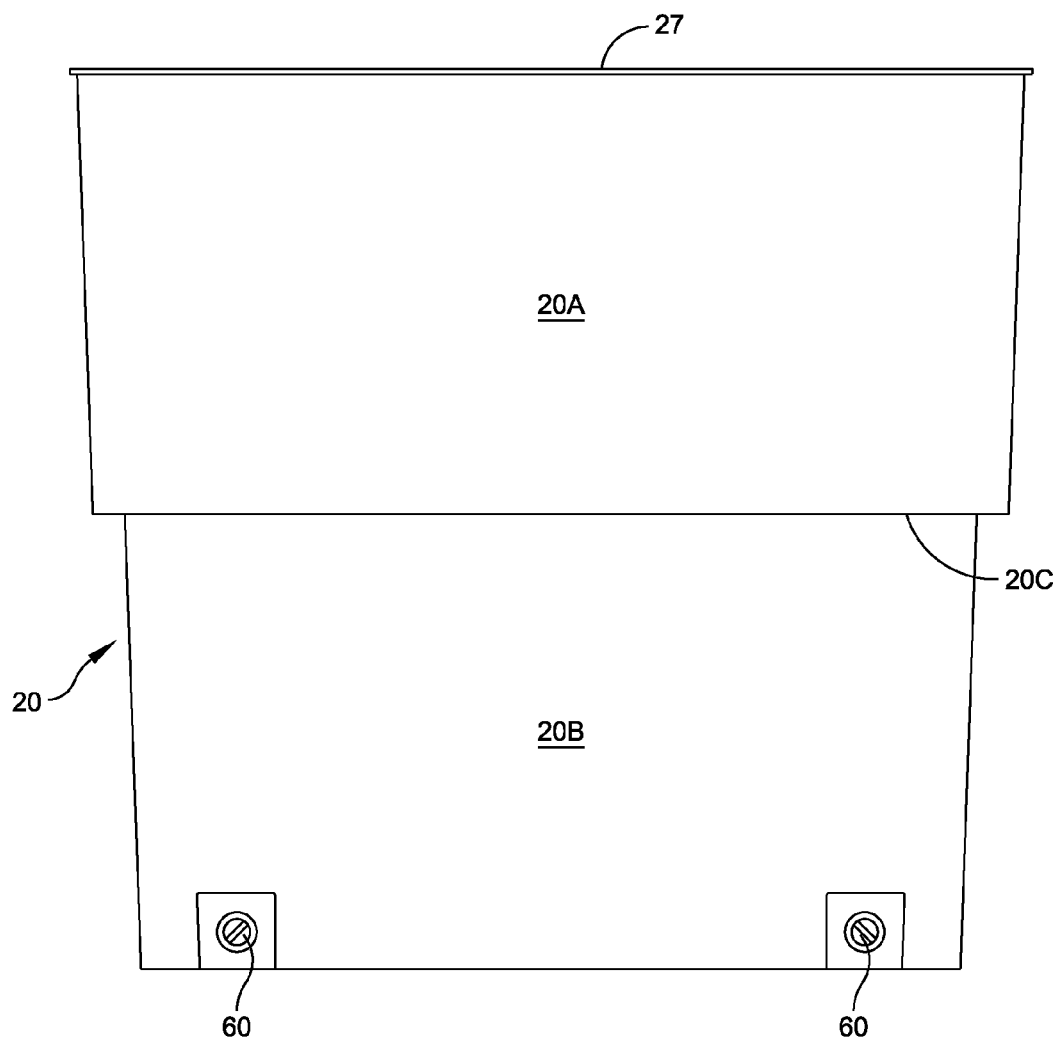
FIG. 13 is a front view of the barrel member.
Figure 14:
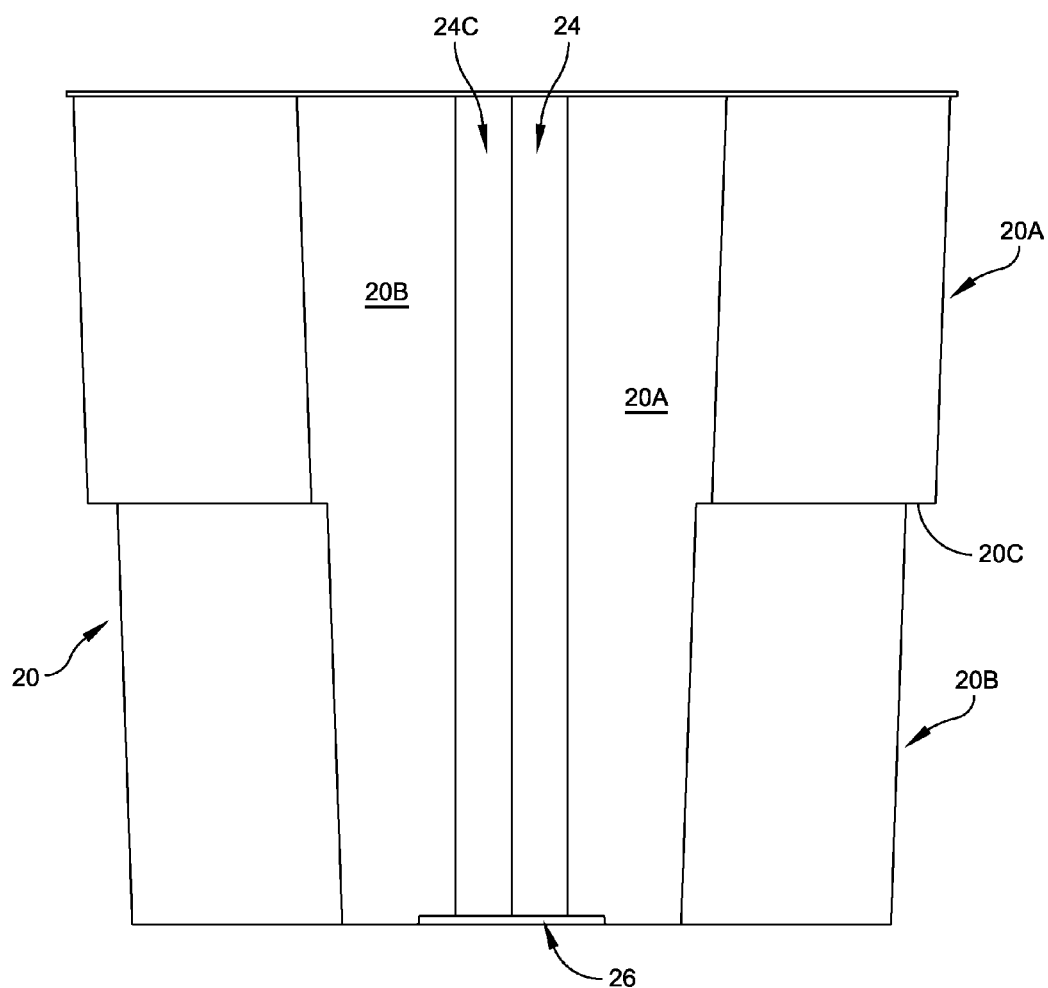
FIG. 14 is a rear view of the barrel member.
Figure 20:
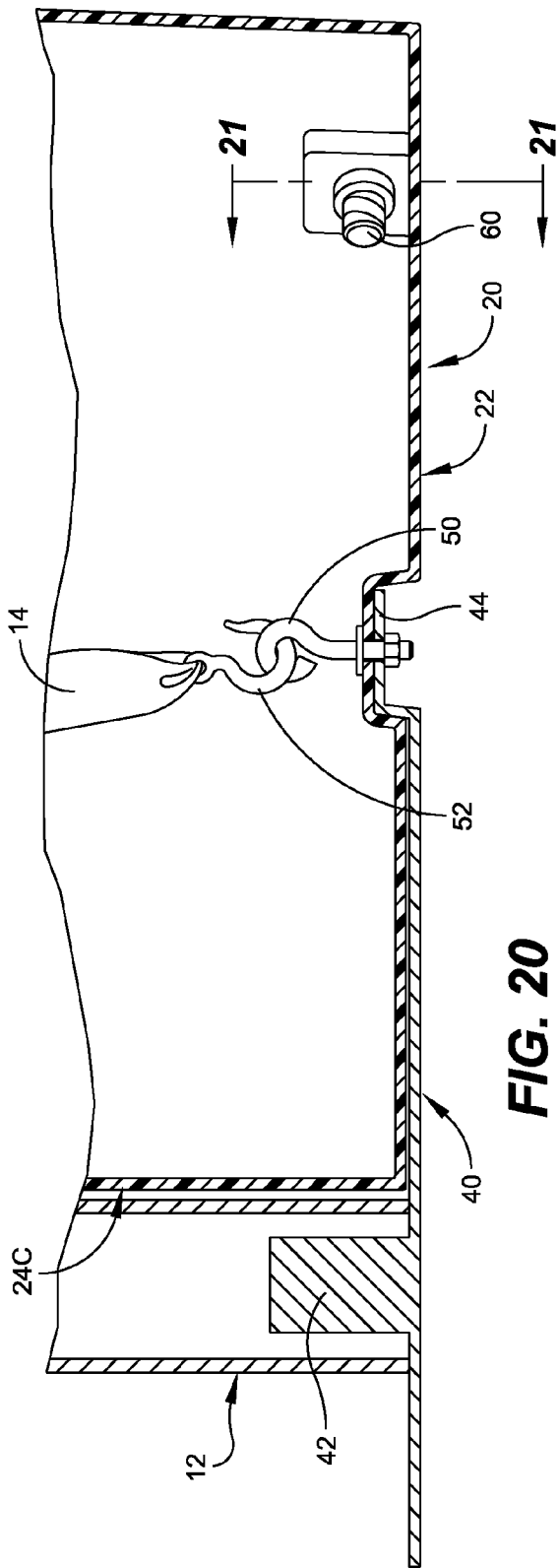
FIG. 20 is a fragmentary cross-sectional view similar to that shown in FIG. 17.
Figure 21:
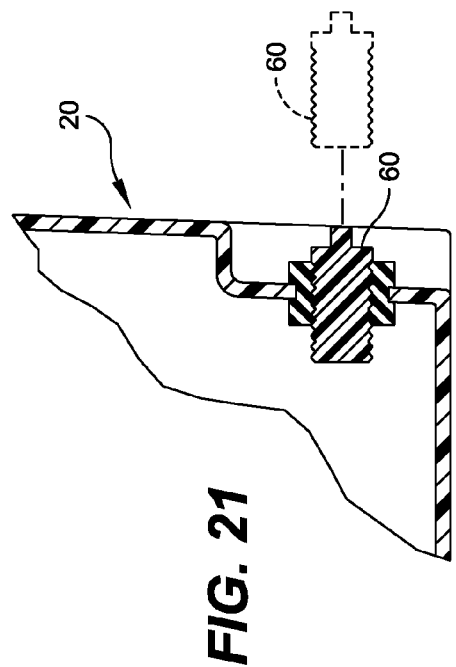
FIG. 21 is a cross-sectional view taken along line 21-21 of FIG. 20.

The channel 26 accommodates the support plate 40. Refer to the cross-sectional view of FIG. 17 that shows the support plate 40 in place with a step end 44 thereof sized for ready engagement with the channel 25. Refer also to the exploded perspective view of FIG. 6 that shows the support plate 40 with its end step 44. It is noted that the step 44 includes a hole 46 that is in alignment with a hole 27 halfway down the channel 25. The hook fastener 50 depicted in FIG. 17 is secured through the holes 27 and 46. The hook fastener 50 preferably has a hook end and a threaded end and a nut engages with the threaded end for securing the hook fastener 50 in place, such as in the position shown in FIG. 17. Refer also to the bottom end of the hook fastener 50 in FIG. 3. The hook fastener 50 provides the attachment for the bottom hook end 52 of the strap 14. Refer also to the cross-sectional view of FIG. 20 which illustrates the support plate 40 secured in place by means of the hook fastener 50. FIG. 20 also shows the bottom end of the strap 14 attached at the hook 52 to the hook fastener 50. FIGS. 20 and 21 also illustrate the drain plug 60 which can be easily removed when it is desired to remove the water from the barrel member. The drain plug 60 is also constructed so that it can be readily screwed into the fitting for providing a watertight seal at the bottom of the barrel member. As illustrated in the drawings, particularly as shown in FIG. 13, a pair of drain plugs 60 may be employed spaced about the cylindrical part of the barrel structure.

The cover 30 is provided and dimensioned so as to engage with the top edge 27 of the barrel member. In this regard refer to the fragmentary cross-sectional view of FIG. 19 that shows the cover 30 with a peripheral edge 32 that is for a snap fit or force fit with the peripheral edge of the barrel member.

Figure 18:
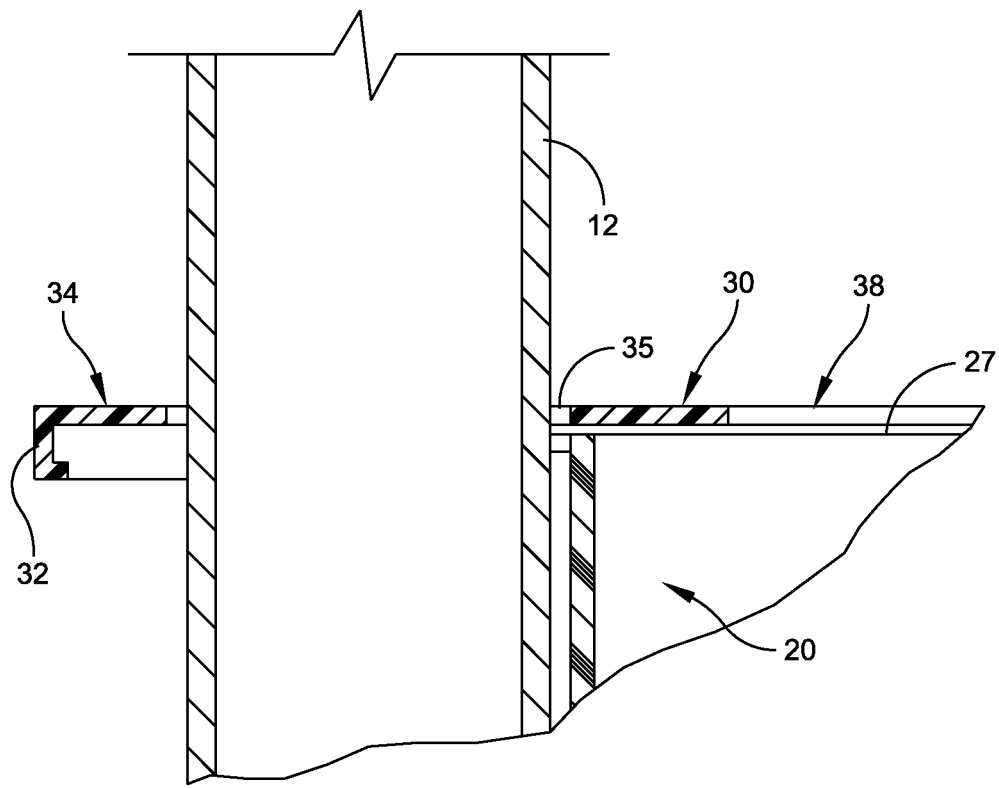
FIG. 18 is a fragmentary cross-sectional view at a top side of the barrel member.
Figure 19:
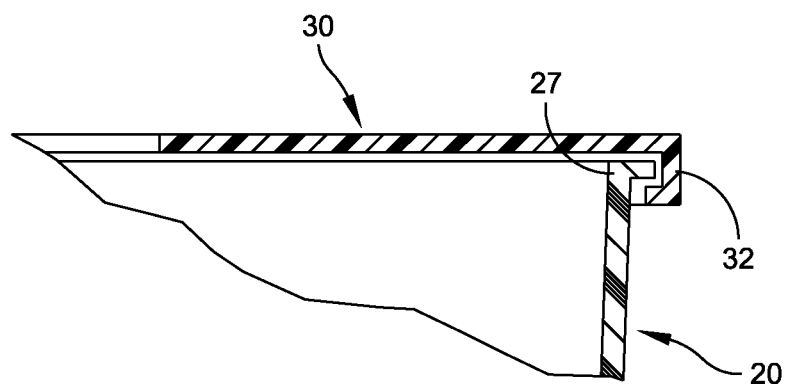
FIG. 19 is a fragmentary cross-sectional view showing the interlock between the cover and the barrel member.
Figure 27:
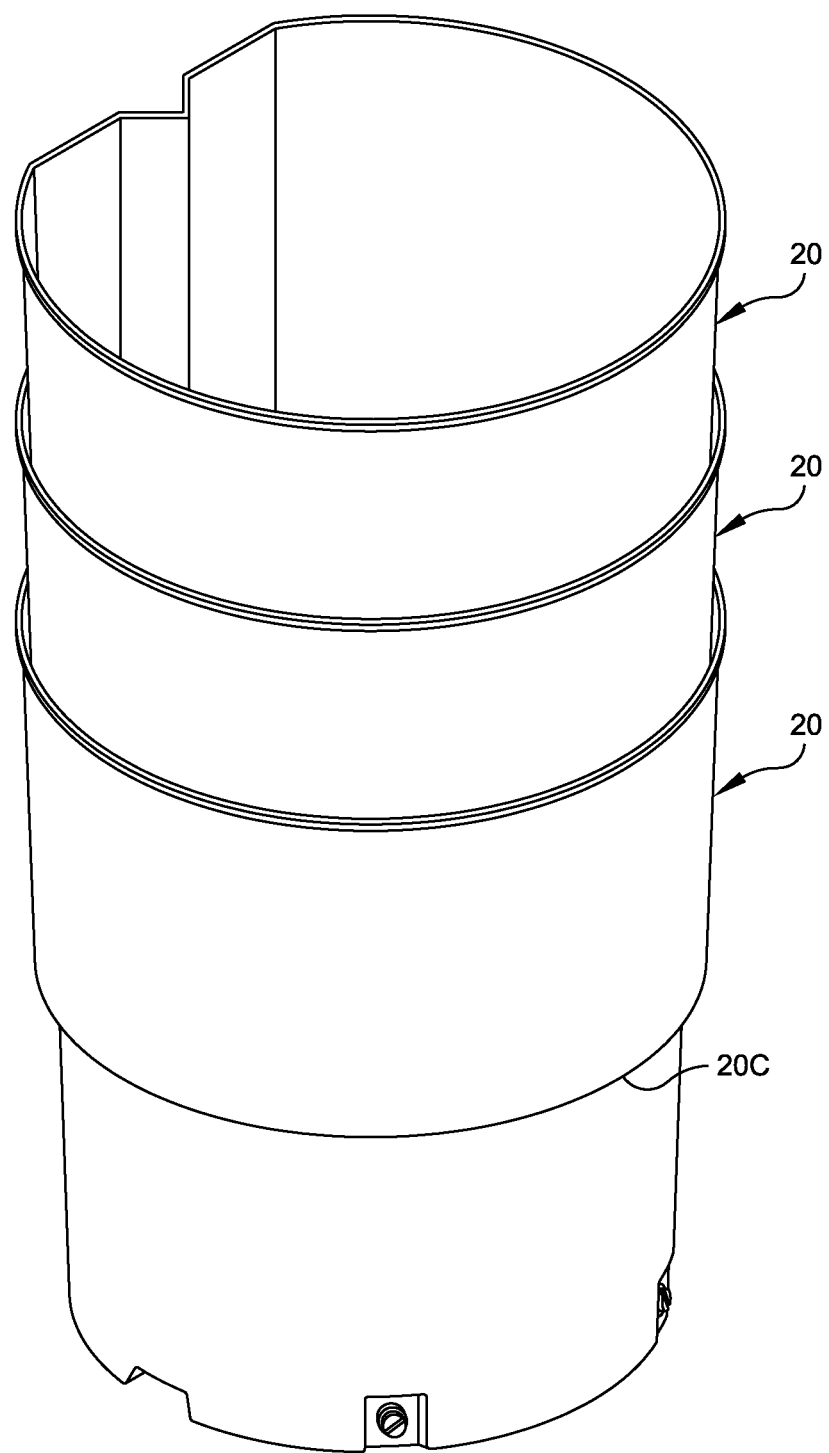
FIG. 27 is a perspective view illustrating the manner in which the barrel members of the present invention can be stacked.

As illustrated in FIGS. 7-10, the cover 30 is basically circular but includes, at one side thereof, a wing 34 that can extend a slight distance beyond the barrel member such as shown in the cross-sectional views of FIGS. 17 and 18. This wing extension enables the provision of a support hole 35 through which the upright tent pole 12 may extend. Again, reference is made to FIGS. 17 and 18 showing the tent pole 12 extending through the hole 35. With the cover 12 firmly secured with the barrel member, this engagement through the hole 35 provides additional support between the tent pole and the barrel member. FIGS. 7-10 also illustrate opposed holes 36. These holes 36 may be preferably open holes and can accommodate the flower pots as illustrated previously in, for example, FIG. 2. Reference is now made to FIG. 27 which is a perspective view showing the manner in which separate barrel members 20 may be readily stacked. Each of the barrel members 20 that is disposed on top of a lower barrel member will be set in position and held in position by engagement with the step 20C. This nesting feature is quite helpful in minimizing the overall space that is needed for storage and transportation of the barrel members. By stacking and nesting the barrel members, less space is taken up in the transportation vehicle.

In the first embodiment of the present invention disclosed in FIGS. 1-21, the barrel member 20 is initially placed in position and the strap 14 is secured at the strap hook 52 to the hook fastener 50 disposed within the barrel member. The strap 14 readily extends through the elongated slit 38. The upper end of the strap 14 is secured in a known manner to the top of the tent pole 12. The tent pole 12 is positioned at its base over the pin 42, once the support plate 40 has been secured in place. Refer to the cross-sectional view of FIG. 17. In this embodiment it is also noted that the tent pole 12 passes through the hole 35 in the cover 34. The ratchet 16 is used to tighten the strap 14. Once the strap 14 is in place, then the barrel member 20 is filled with a liquid, usually water. The plugs 60 are in their closed position. The weight of the water within the barrel member 20 holds the barrel member in a fixed and secure position. The tent pole 12 is disposed within, and extends along, the V-shaped groove 24C and thus the tent pole 12 firmly engages within this V-shaped groove. As indicated previously, this groove 24C may have other shapes and configurations.

At a later time when it is desired to remove the tent straps or ropes, then the barrel member may be readily emptied by opening up or removing the drain plugs 60. The lower end of the strap 14 may then be disengaged at the hook fastener 50 by action of the ratchet mechanism 16. The individual barrel members may then be stacked in a manner illustrated in FIG. 27 for transportation to another site.

Figure 22:
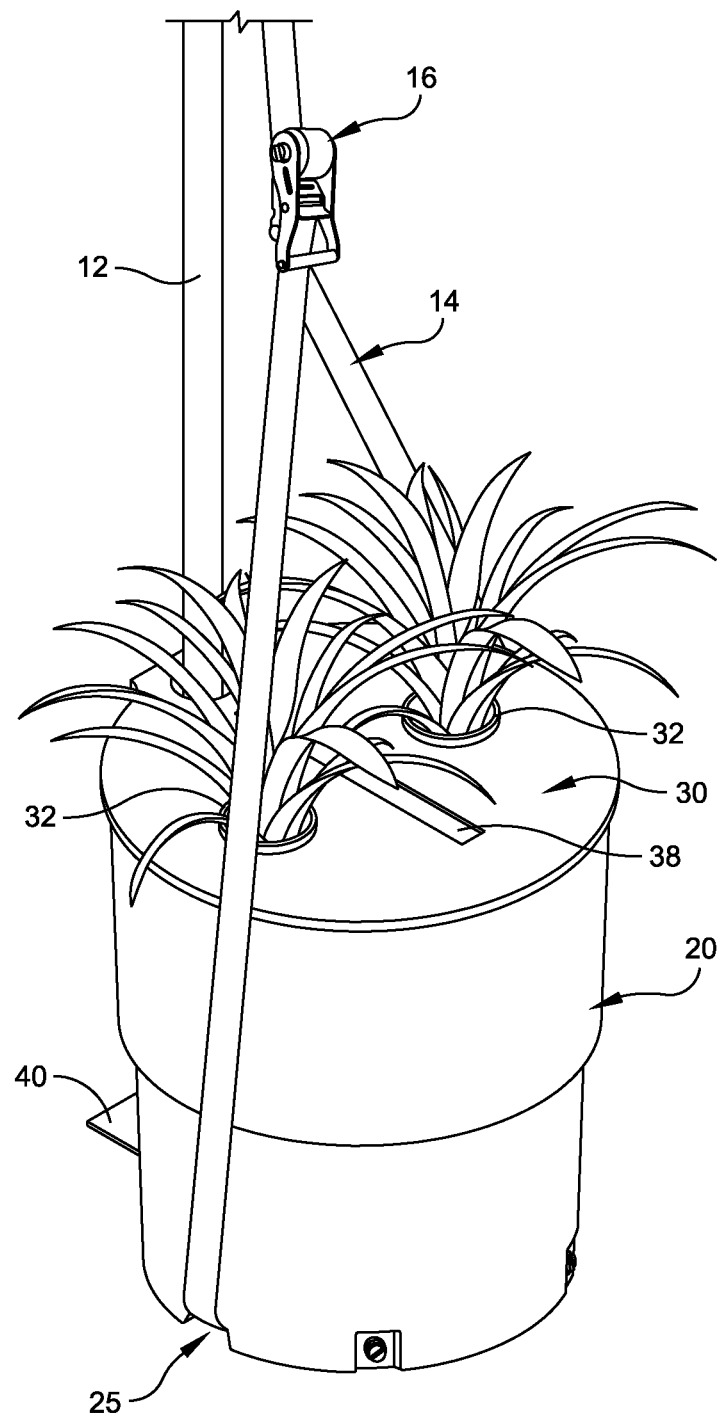
FIG. 22 is an illustration of another means of holding the strap to the barrel member.

Reference is now made to FIG. 22 which discloses the substantially identical barrel member 20 as previously discussed in connection with FIGS. 1-21. The main difference in FIG. 22 is that the strap 14, rather than extending through the slit 38, wraps under the barrel member 20 extending through the channel 25. The strap 14 illustrated in FIG. 22 below the ratchet 16 may be in a closed loop with the strap extending completely through the channel 25 and thus providing a secure attachment between the strap or rope and the barrel member. In this embodiment it is also noted that the tent pole 12 extends through the cover 30 and may be positioned in substantially the same manner as shown in the cross-sectional view of FIG. 17. However, in the arrangement illustrated in FIG. 22 there is no need for the hook fastener 50 as a strap 14 wraps about the entire bottom of the barrel member.

Figure 23:
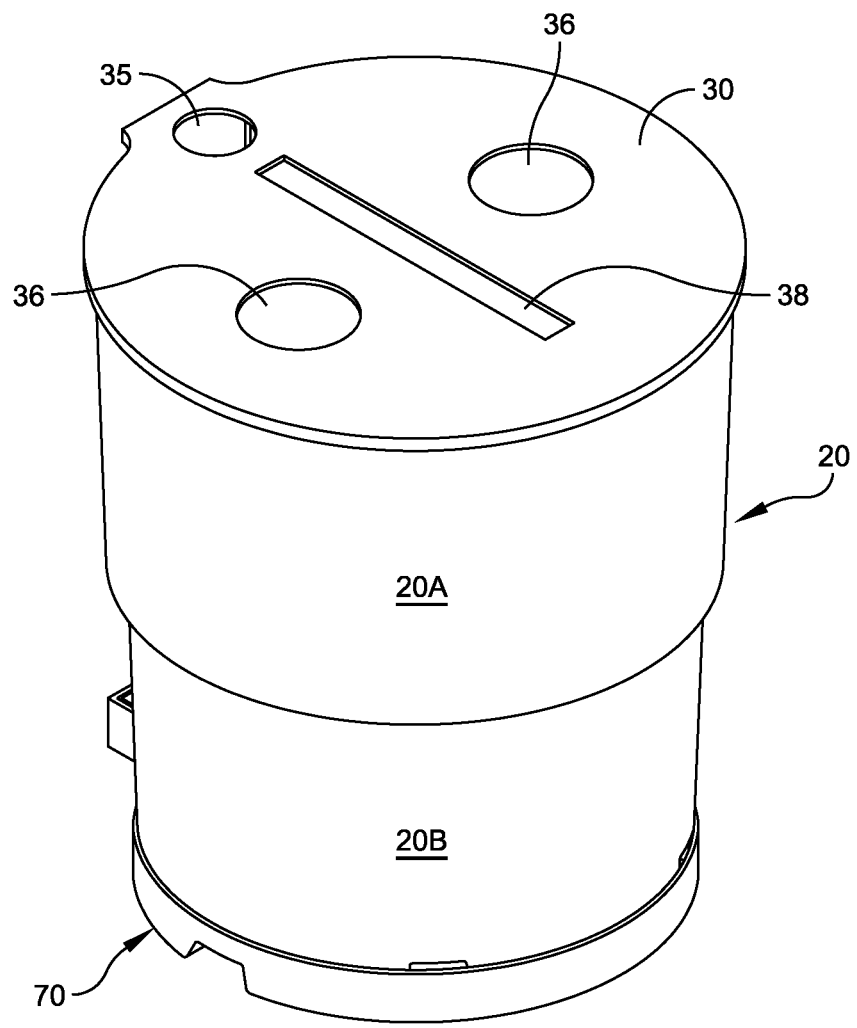
FIG. 23 is an alternate embodiment of a barrel member that further includes an annular base.

Reference is now made to a further embodiment of the present invention illustrated in FIGS. 23-26. In this embodiment the same reference characters will be used for like components previously described in connection with the first embodiment of the present invention. Thus, the barrel member 20 includes an upper partially cylindrical section 20A and a lower partially cylindrical section 20B. The cover 30 fits over the top edge of the barrel member and may be provided with the single hole 35 for accommodating the tent pole and holes 36 for accommodating a potted plant. There is illustrated in FIG. 23, the cover 30 also includes the elongated slit 38.

Figure 24:
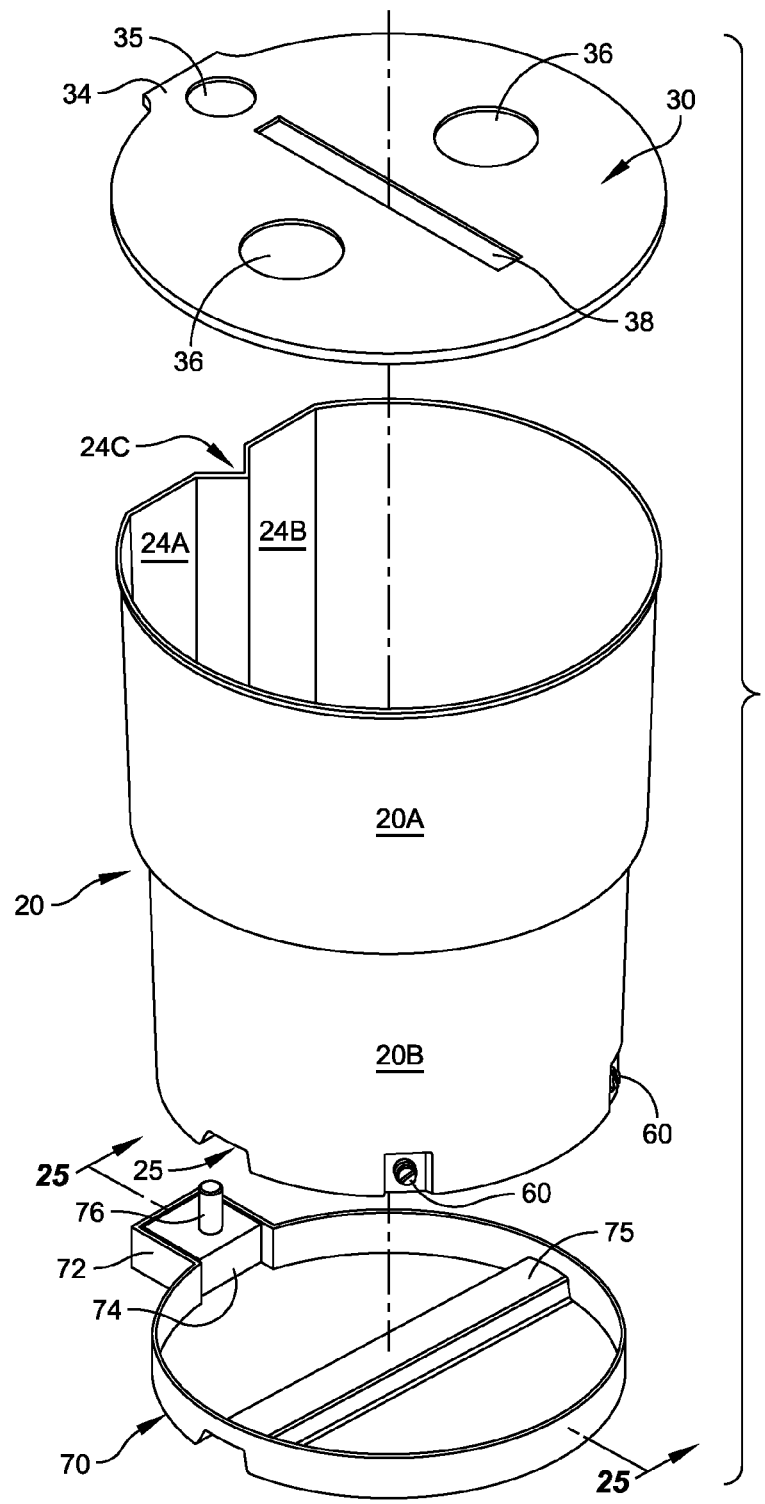
FIG. 24 is an exploded perspective view of the embodiment illustrated in FIG. 23.

In the embodiment described in FIGS. 24-26, in addition to the barrel member 20, there is also provided an annular base 70 upon which the barrel member 20 rests. It is noted in this embodiment that the base 70 may be considered as replacing the support plate 40 previously used in the first embodiment. The annular base 70 includes an extension arm 72 for housing block 74 which in turn is for support of the alignment pin 76. The annular base 70 is also provided with a cross-channel 75 that is constructed, arranged and dimensioned so as to be received within the channel 25 of the barrel member, when the barrel member is disposed on the annular base 70. Refer to the cross-sectional views of FIGS. 25 and 26. FIG. 26, in particular, illustrates the barrel member 20 resting upon the annular base 70. FIG. 26 also illustrates the bottom of the tent pole 14 in alignment with the pin 76. Also illustrated in FIG. 26 is the hook fastener 80 that is engaged by the hook end 82 of the strap 14. The hook fastener 80 is secured between respective holes in the bottom wall of the barrel member and at the channel of the base 70. The setup for the embodiment of FIGS. 23-26 is substantially the same as previously described in connection with the first embodiment described in FIGS. 1-22. The hook fastener 80 assures that the barrel member 20 and base 70 are secured together. The alignment pin 76 allows alignment of the tent pole and positioning of the tent pole within the accommodating groove of the barrel member as described previously. This is illustrated in FIG. 24 by the V-shaped groove 24C along with the separated flat surfaces 24A and 24B.

Figure 28:
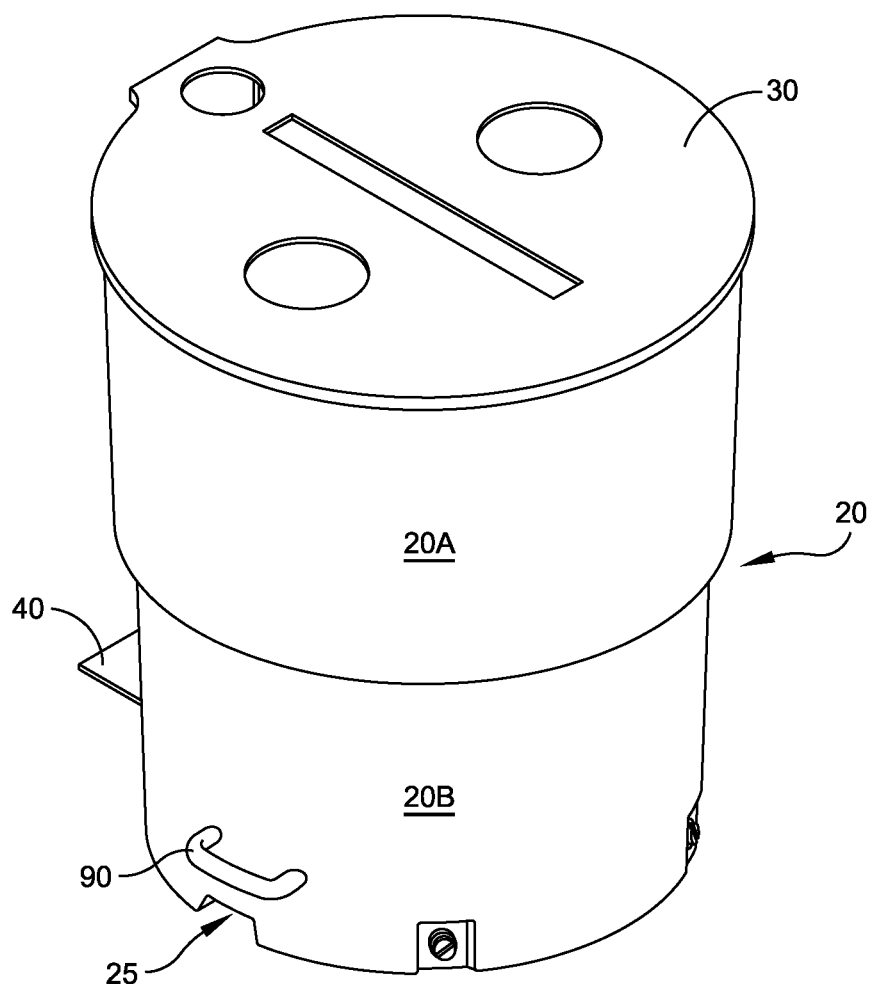
FIG. 28 is a perspective view of still another embodiment of the present invention employing handles at opposite bottom sides thereof.

Reference is now made to some alternate versions of the present invention. FIG. 28 illustrates a barrel member that is substantially identical to the one illustrated in FIG. 4. This embodiment may thus use the support plate 40 and includes a lower channel 25. In addition, in the embodiment of FIG. 28 there are provided diametrically opposed handles 90. In this regard it is noted that in FIG. 22 the strap 14 extended through the channel 25. However, in the embodiment of FIG. 28 the one or more ends of the strap 14 may be attached at the handle 90. In FIG. 28 also a single handle 90 is shown. However, it is understood that a like handle may be secured to the barrel member at the opposite end of the channel 25.

Figure 29:
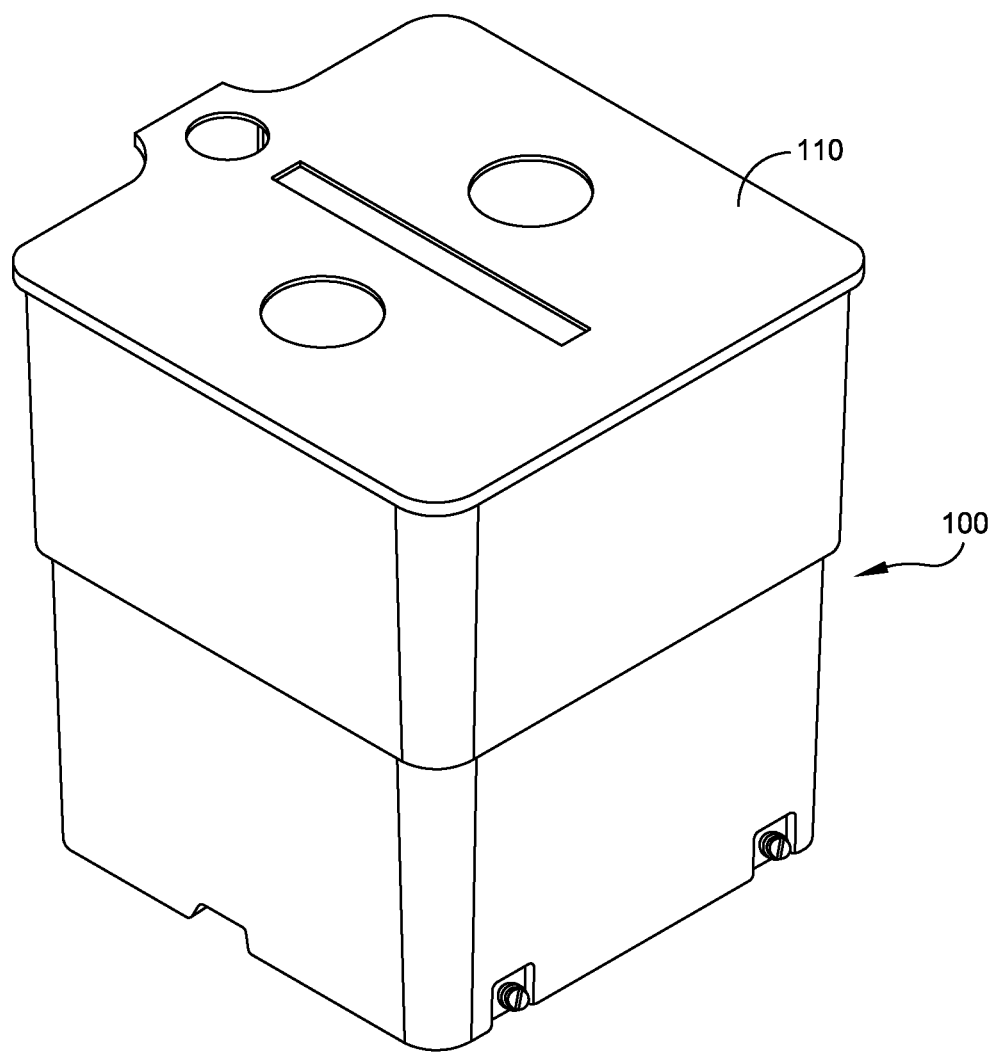
FIG. 29 is an alternate embodiment of the present invention in which the barrel member is square rather than cylindrical.
Figure 30:
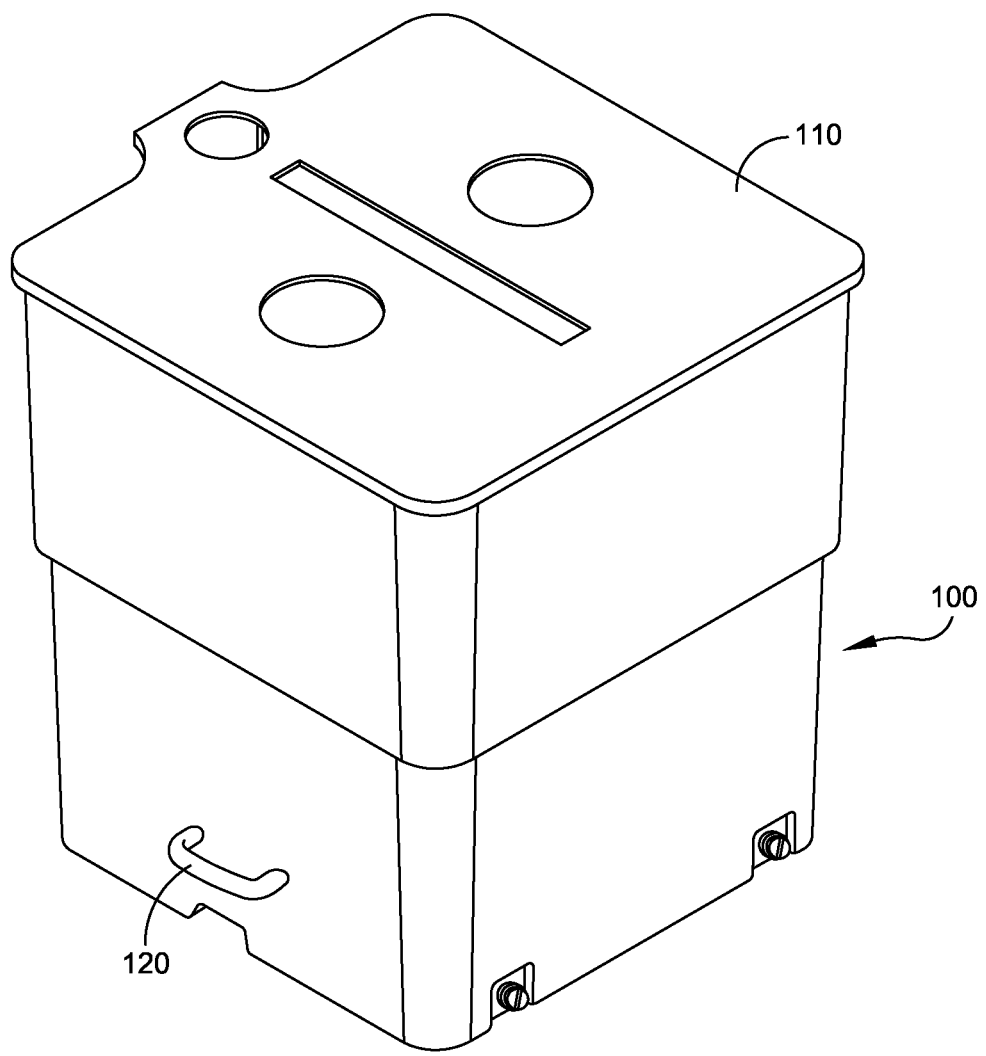
FIG. 30 is a perspective view similar to that shown in FIG. 29 but employing oppositely disposed handles at the base of the barrel member.

FIG. 29 illustrates an alternate embodiment in which the barrel member is square rather than cylindrical. The rear side of the barrel member may also be provided with the flat surfaces in previously mentioned V-groove although these are not illustrated in FIG. 29. FIG. 29 shows the barrel member 100 and the cover 110. FIG. 30 also illustrates the barrel member 100 and the cover 110 with the addition of either a single handle 120 or opposed handles 120.

Figure 31:
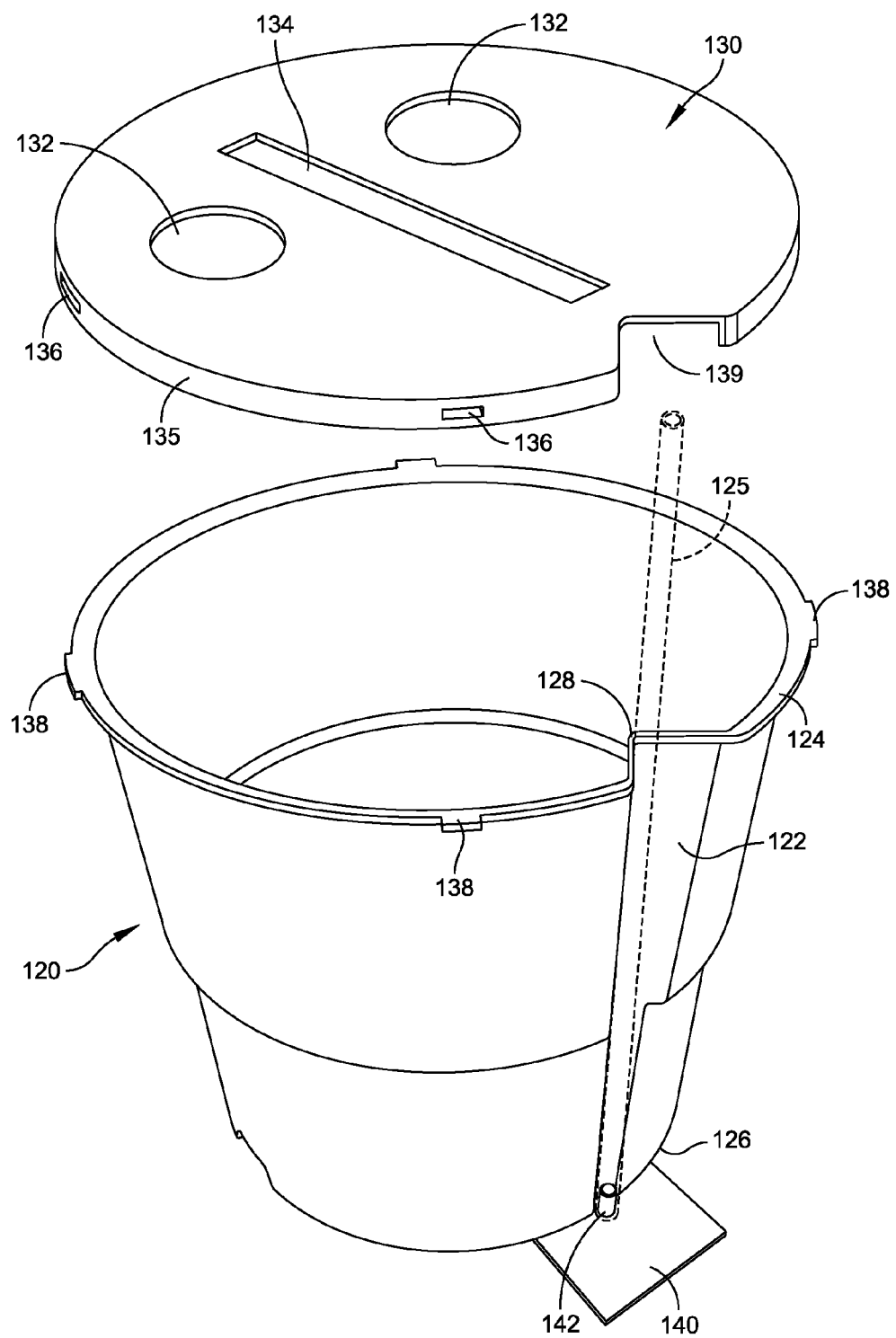
FIG. 31 is a perspective view of a preferred embodiment of the anchor apparatus of the present invention.
Figure 32:
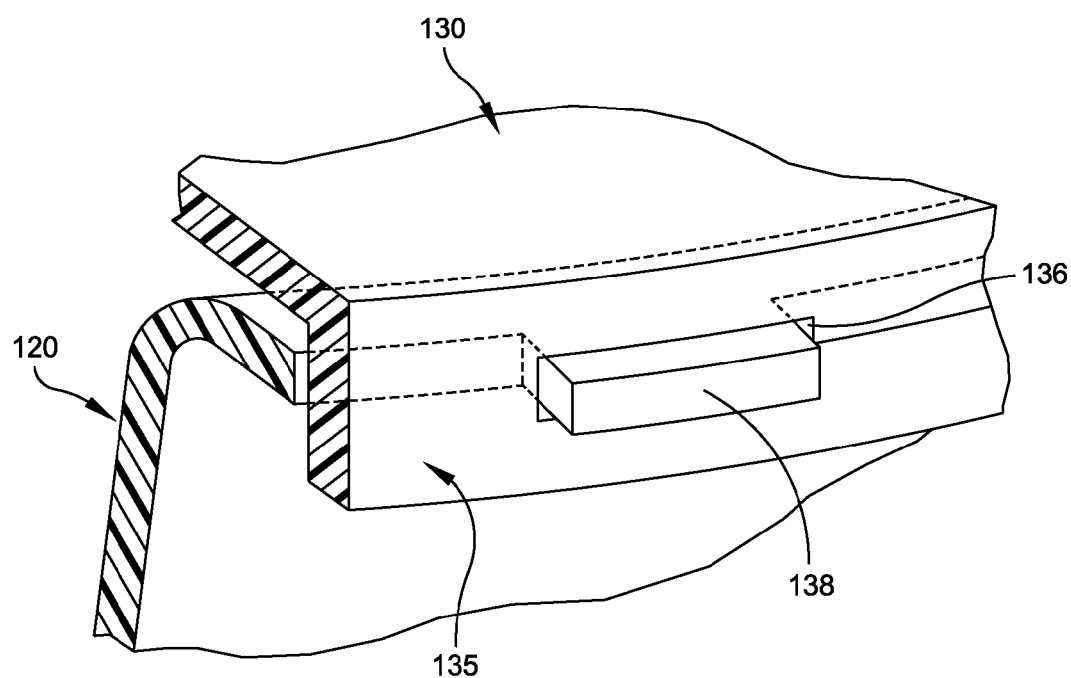
FIG. 32 is a fragmentary cross-sectional view showing the manner in which the cover interlocks with the barrel member.
Figure 33:
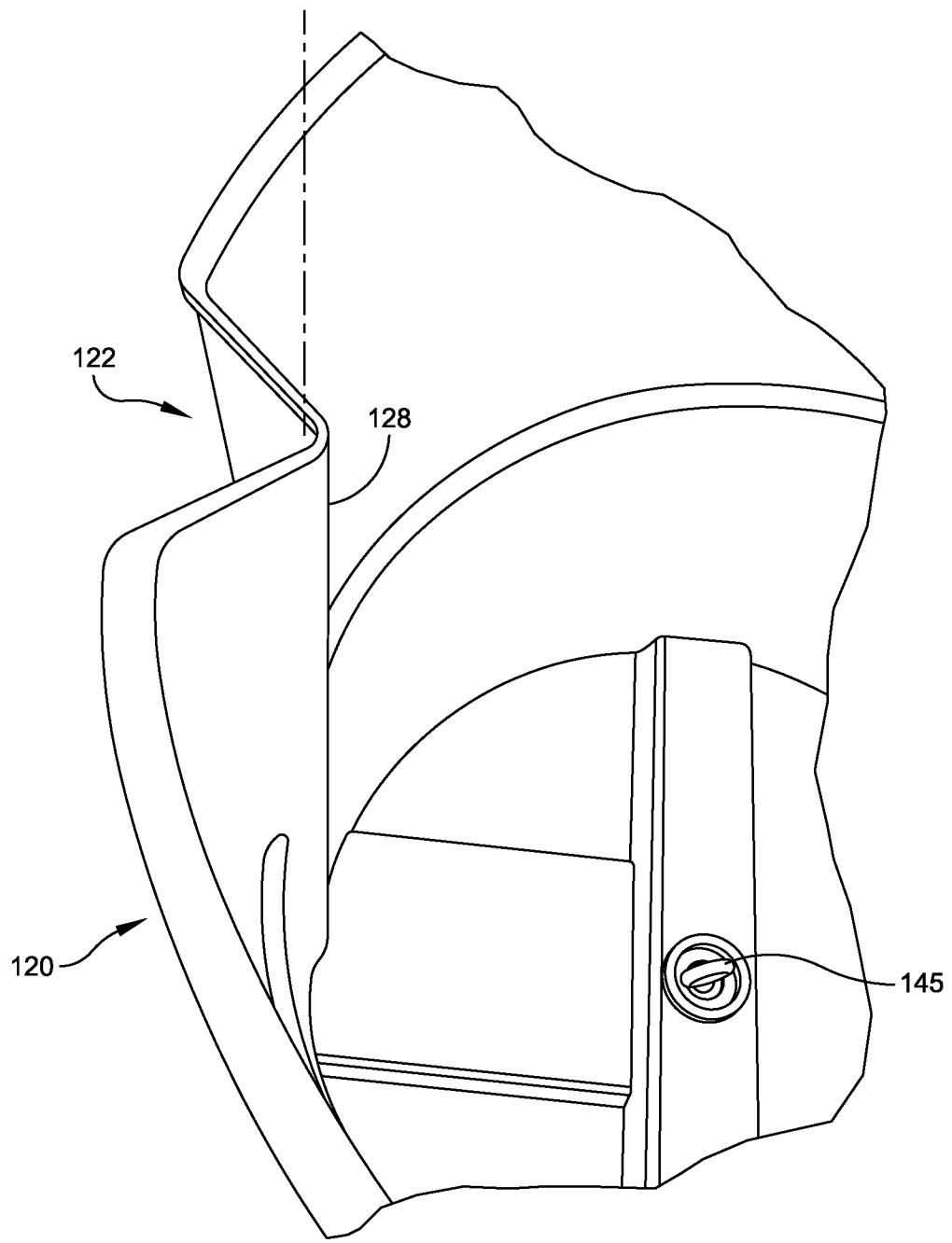
FIG. 33 is a fragmentary perspective view as viewed inside the barrel member.

Reference is now also made to a further embodiment of the present invention illustrated in FIGS. 31-35. This embodiment is comprised of a barrel member 120 that includes upper and lower cylindrical sections. The barrel member 120 may be substantially identical to the barrel member previously described, such as illustrated in the perspective view of FIG. 11. The primary difference between the embodiment of the barrel member shown in FIG. 11 and that described in FIGS. 31-35 is that there are no flat surfaces 24A, 24B. Instead, there is a single V-shaped groove 122 that extends from the barrel member top edge 124 continuously down to the barrel member bottom edge 126, as illustrated in FIG. 31. Because the upper and lower barrel portions are tapered, the width of the V-shaped groove 122 is wider at the top thereof than at the bottom. The V-shaped groove 122 is defined by a substantially vertical apex 128. The apex wall 128 extends substantially at right angles to the plane of the bottom of the barrel member. Refer also to FIG. 33 that shows the apex 128. Because the tent pole is generally meant to extend vertically, the V-shaped groove 122 on the side of the barrel member is arranged so as to accommodate the vertically extending tent pole shown in dotted outline at 125 in FIG. 31. Although the groove 122 is shown as V-shaped, this groove may also take on other shaped such as U-shaped. Each of these shapes has a common vertical wall segment into which the tent pole extends.

The embodiment of the invention illustrated in FIGS. 31-35 also includes a cover 130 having holes 132 that may accommodate flower pots and an elongated slot 134 for accommodating the strap or rope. Refer to previous FIGS. 2-4 for an illustration of the strap and the manner in which it is accommodated through the elongated slot or slit 134. In the embodiment of FIGS. 31-35, the cover 130 is also provided with a peripheral lip 135 that may be provided with spaced slots 136. The peripheral edge 124 of the barrel member is provided with corresponding tabs 138 that can interlock with the slits 136. In this way the cover can be force fit over the top of the barrel member. Because the cover is made of a somewhat flexible plastic material, it can also be flexed, along with a flexture of the barrel member itself so as to be able to remove the cover 130, if necessary. When the cover 130 is in place, it is firmly attached to the top edge 124 of the barrel member. In this regard refer also to the interlock illustrated in the fragmentary view of FIG. 32. It is furthermore noted that the cover 130 is provided with a V-shaped slot 139 that preferably mentions the contour of the V-shaped groove 122.

In order to secure the barrel member with the tent, and in particular with the tent pole, there is provided a support plate 140 which may be substantially identical to the support plate 40 previously described in connection with the first embodiment. In this regard, refer to FIG. 20 that shows the final positioning of the support plate 40 relative to the bottom of the barrel member. As illustrated in FIG. 31, the support plate 140 is provided with a pin or stud 142. The bottom end of the tent pole is meant to extend over the stud 142 for holding the tent pole in position and the proper orientation with respect to the side wall of the barrel member 120.

Figure 34:
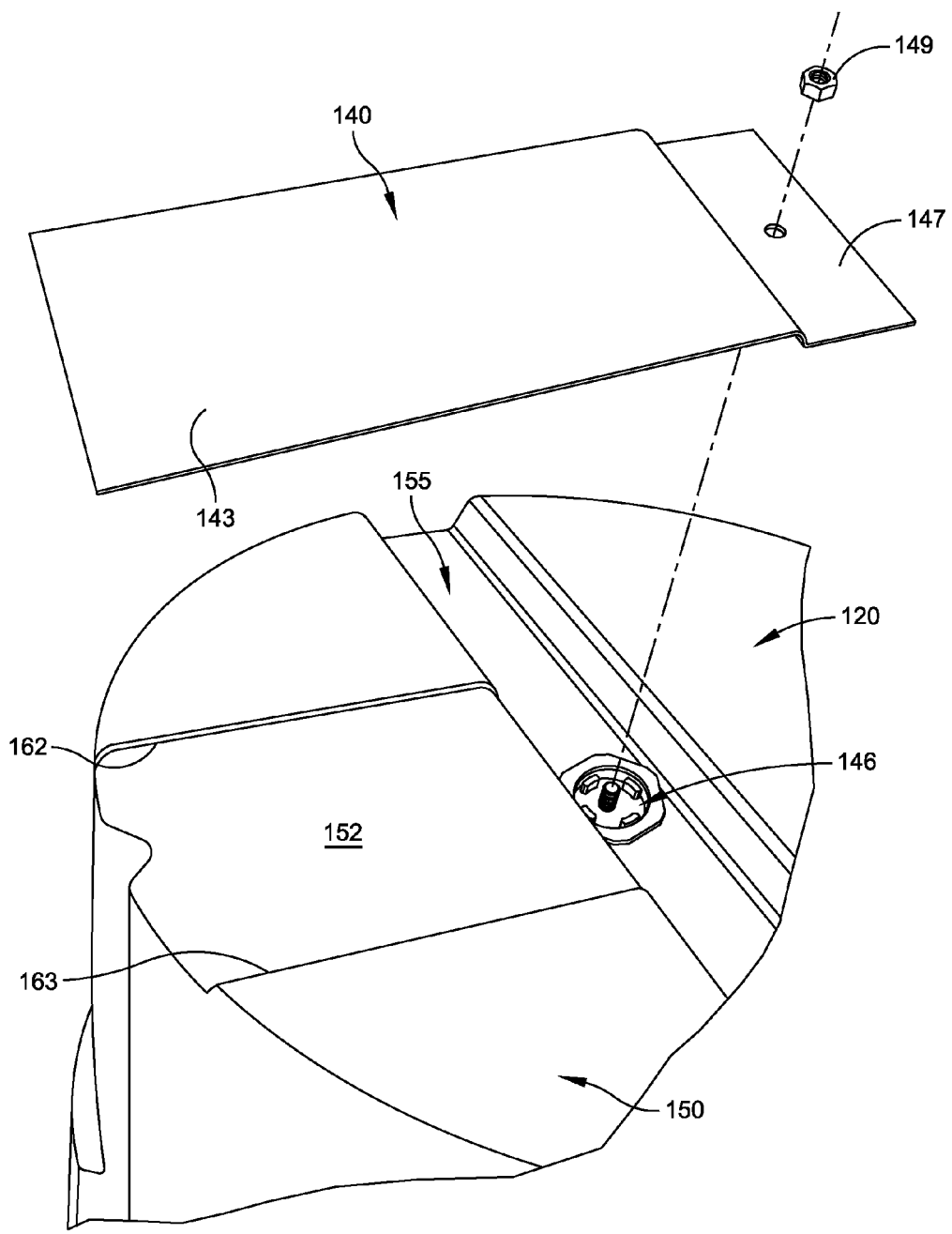
FIG. 34 is a fragmentary perspective view at the bottom of the barrel member showing the support plate exploded away from the barrel member.
Figure 35:
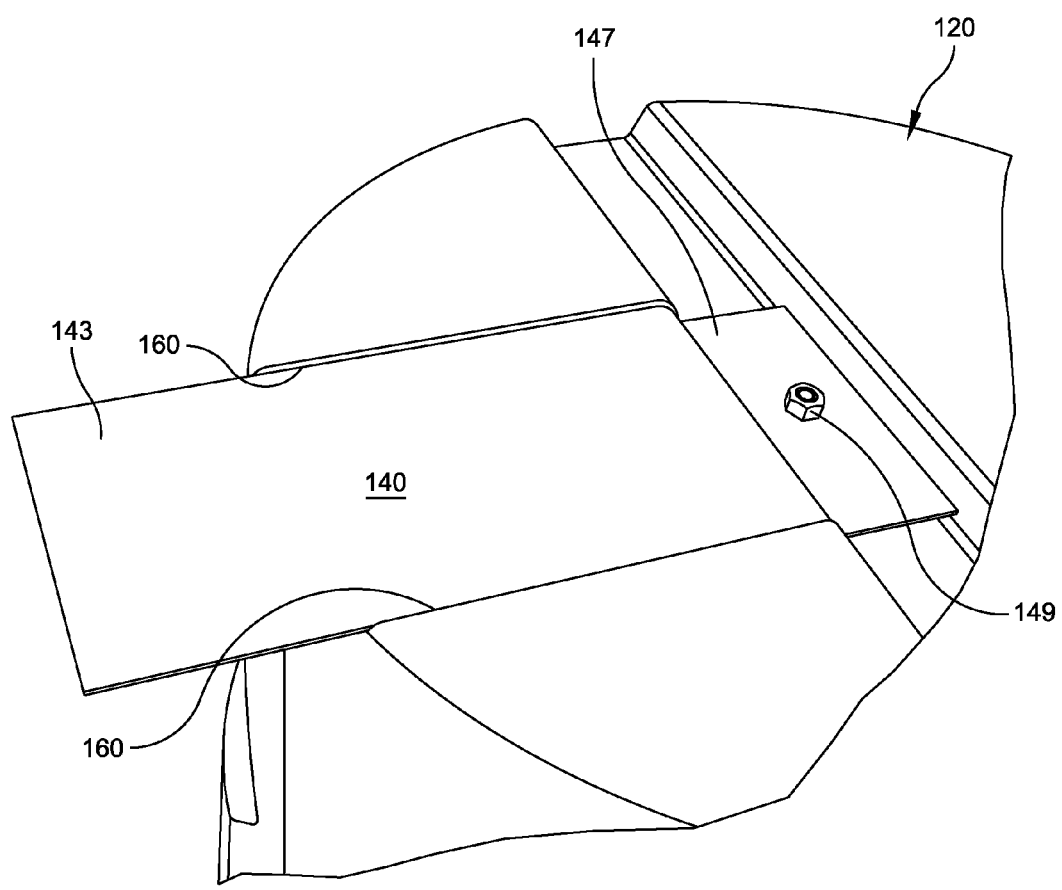
FIG. 35 is a view similar to FIG. 34 showing the support plate in position.

In the embodiment of the invention illustrated in FIGS. 31-35, the same type of a bottom wall anchor hook may be employed. The top of this is illustrated in FIG. 33 at 145 while FIG. 34 illustrates the bottom side thereof at 146. FIG. 34 shows the bottom 150 of the barrel member as provided with a slight channel 152 that is dimensioned so as to snugly receive the main flat portion 143 of the support plate 140. As also illustrated in FIG. 34, the support plate 140 is provided with the stepped end 147 that is to be accommodated in the cross-channel 155 at the bottom of the barrel member 120. FIG. 34 is an exploded view and thus the support plate 140 is shown exploded away from the bottom of the barrel member. FIG. 35, however, on the other hand, illustrates the support plate 140 in position with the main portion 143 thereof snugly received within the channel 152. It is noted that the sides of this support plate 140 at 160 dimensioned so as to snugly be received in the sides 162 of the channel 152. In this way, once the support plate 140 is in position, as illustrated in FIG. 35, the nut 149 is used for securing the support plate in place. In that position, do to the snug fit of the support plate 140 in the channel 152, there is no rotational movement of the support plate relative to the barrel member. This thus provides a stable connection between the barrel member and the tent pole.

Figure 36:
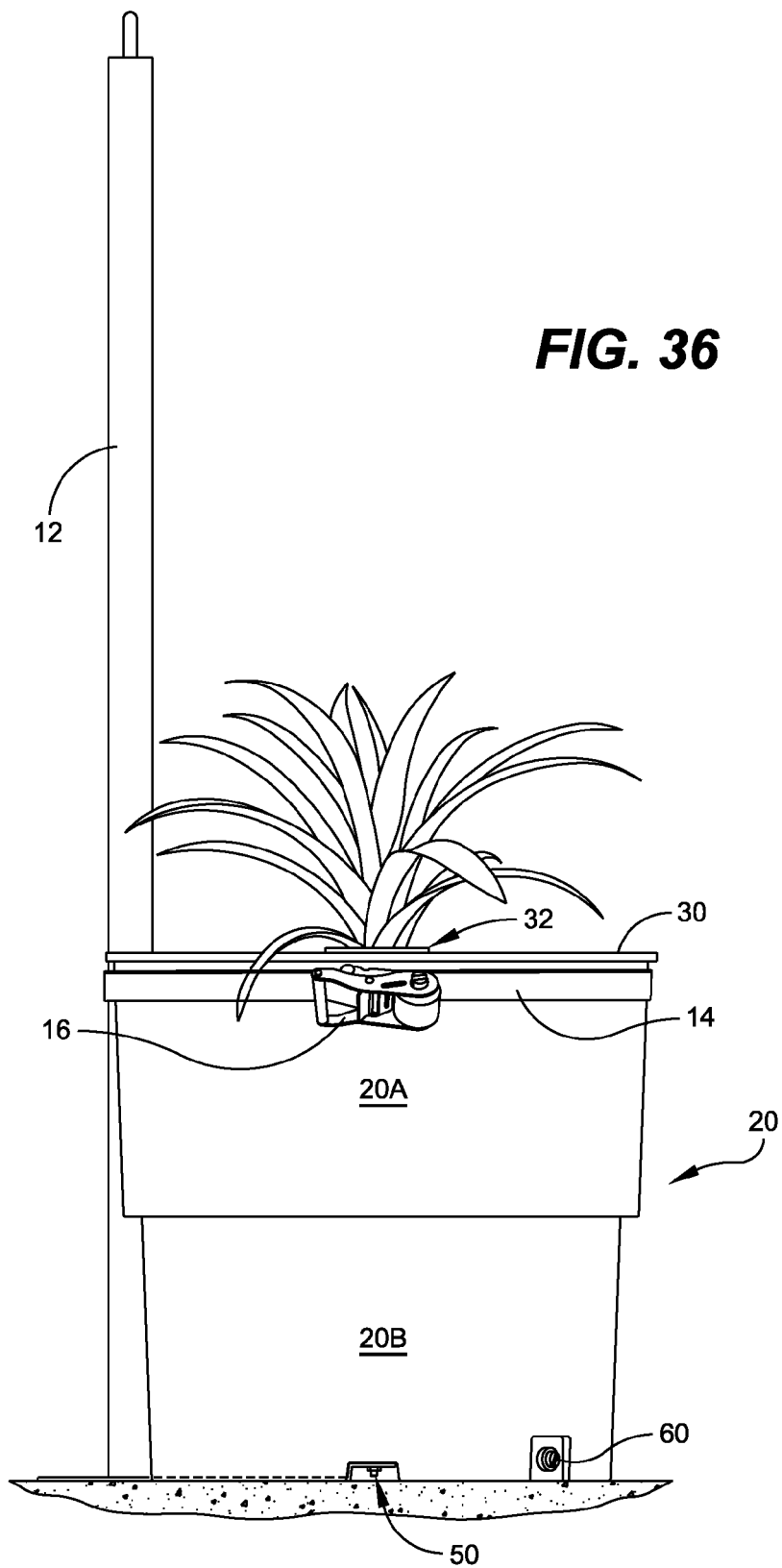
FIG. 36 is a view similar to that shown in FIG. 3 with a different strap arrangement.

FIG. 36 shows an alternate arrangement in which the barrel member 20 is secured to the pole 12. This includes a strap 14 with the associated buckle 16 disposed about the barrel member preferably just below the cover 30 and the lip on the top section 20A.

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. An anchor apparatus for securing a tent pole, comprising:
   a barrel member including a bottom surface;
   a cover disposed on the barrel member;
   said barrel member and said cover forming an internal chamber that is to be filled with a liquid so as to provide a significant weight for anchoring the barrel member;
   said barrel member having at least one drain to enable the liquid to be removed from the barrel member;
   said cover having a passage for receiving an adjustment strap that inter-connects the barrel member with the tent pole;
   a fastener secured to the bottom surface of the barrel member for engaging and securing the strap to the bottom surface of the barrel member;
   a channel disposed in the bottom surface and defining a mounting surface for the fastener;
   the passage for receiving the strap being defined by a diametrically disposed slot in the cover with the strap extending through the diametrically disposed slot and attached to the fastener;
   said barrel member having an elongated groove extending substantially vertically along the barrel member for receiving the tent pole at least partially supported therein;
   and a support plate disposed under the bottom surface of the barrel member for supporting the tent pole and extending from the groove transverse to the channel.

2. The anchor apparatus of claim 1 wherein the cover has a hole adjacent a side thereof through which the tent pole can extend and in alignment with the elongated groove.

3. The anchor apparatus of claim 2 wherein the elongated groove is defined in a flat side of the barrel member.

4. The anchor apparatus of claim 1 wherein the drain includes at least one drain plug at a lower end of the barrel member.

5. The anchor apparatus of claim 1 wherein the support plate has one and another ends with the one end thereof disposed within said channel and the other end thereof having a support post for receiving the bottom of the tent pole.

6. The anchor apparatus of claim 5 wherein the the one end of the support plate is stepped to fit within the channel and is secured by means of the fastener.

7. The anchor apparatus of claim 6 wherein the support post of the support plate is in line with the elongated groove.

8. The anchor apparatus of claim 1 wherein the cover has a hole separate from the diametrically disposed slot and arranged adjacent an edge of the cover and in line with the diametrically disposed slot.

9. The anchor apparatus of claim 1 wherein the barrel member is substantially cylindrical in shape and includes a stepped side wall.

10. The anchor apparatus of claim 1 wherein the barrel member has a slanted sidewall that allows the barrel member to be stackable.

11. The anchor apparatus of claim 1 including at least one handle on a sidewall of the barrel member.

12. The anchor apparatus of claim 11 including a pair of oppositely disposed handles on the barrel member.

13. The anchor apparatus of claim 1 wherein the barrel member has a substantially square shape.

14. The anchor apparatus of claim 1 wherein the support plate being a base ring upon which the barrel member rests.

15. The anchor apparatus of claim 14 wherein the base ring has a support post for receiving the tent pole.

16. The anchor apparatus of claim 15 wherein the base ring includes a channel member that engages with the channel in the bottom surface of the barrel member.

17. An anchor apparatus for securing a tent pole, comprising:
- a barrel member including a bottom surface;
- a cover disposed on the barrel member;
- said barrel member and cover forming an internal chamber that is to be filled with a liquid so as to provide a significant weight for anchoring the barrel member;
- said barrel member having at least one drain to enable the liquid to be removed from the barrel member;
- said barrel member having an elongated groove extending substantially vertically along the barrel member for receiving the tent pole at least partially supported therein;
- said barrel member having a passage for receiving an adjustment strap that inter-connects the barrel member with the tent pole;
- the passage for receiving the strap being defined by a channel in the bottom surface of the barrel member, said channel extending across a width of the bottom surface;
- and an adaptor plate at the bottom surface of the barrel member extending transverse to said channel and including opposite ends thereof for mounting the tent pole.

18. The anchor apparatus of claim 17 wherein one end of the adaptor plate sits within said channel and the other end of the adaptor plate has a support post for receiving the tent pole.

19. The anchor apparatus of claim 17 including a fastener at the bottom surface of the barrel member for engaging the strap.

20. An anchor apparatus for securing a tent pole, comprising:
- a barrel member including a bottom surface;
- a cover disposed on the barrel member;
- said barrel member and cover forming an internal chamber that is to be filled with a liquid so as to provide a significant weight for anchoring the barrel member;
- said barrel member having at least one drain to enable the liquid to be removed from the barrel member;
- said cover having a passage for receiving an adjustment strap that inter-connects the barrel member with the tent pole;
- a fastener secured to the bottom surface of the barrel member for engaging and securing the strap to the bottom surface of the barrel member;
- the passage for receiving the strap being defined by a slot in the cover with the strap extending through the slot and attached to the fastener;
- and a support plate disposed under the bottom surface of the barrel member and for supporting the tent pole; and
- the support plate having one and another ends with the one end thereof secured by the fastener and the other end thereof having a support post for receiving a bottom of the tent pole.

21. The anchor apparatus of claim 20 including a channel disposed in the bottom surface and defining a mounting surface for the fastener.

22. The anchor apparatus of claim 21 wherein the support plate has one and another ends with the one end thereof disposed within said channel and the other end thereof having the support post for receiving the bottom of the tent pole.

23. The anchor apparatus of claim 21 wherein the support plate extends transverse to the channel.

* * * * *